(12) United States Patent
Zhang et al.

(10) Patent No.: US 9,098,292 B1
(45) Date of Patent: Aug. 4, 2015

(54) AUTOMATIC GENERATION OF AN OPTIMIZED ARRANGEMENT FOR A MODEL AND OPTIMIZED CODE BASED ON THE MODEL

(71) Applicant: The MathWorks, Inc., Natick, MA (US)

(72) Inventors: Yuchen Zhang, Dover, MA (US); Beth Cockerham, Melrose, MA (US); Xiaocang Lin, Sherborn, MA (US); Partha Biswas, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/264,474

(22) Filed: Apr. 29, 2014

(51) Int. Cl.
G06F 9/44 (2006.01)

(52) U.S. Cl.
CPC .. G06F 8/35 (2013.01); G06F 8/20 (2013.01); G06F 8/30 (2013.01); G06F 8/355 (2013.01)

(58) Field of Classification Search
CPC .................. G06F 8/355; G06F 8/00–8/38
See application file for complete search history.

(56) References Cited

U.S. PATENT DOCUMENTS

| | | | |
|---|---|---|---|
| 8,869,100 B1 * | 10/2014 | Szpak et al. | 717/105 |
| 2003/0079200 A1 * | 4/2003 | Leymann et al. | 717/104 |
| 2007/0067761 A1 * | 3/2007 | Ogilvie et al. | 717/146 |
| 2008/0189679 A1 * | 8/2008 | Rodriguez et al. | 717/105 |
| 2009/0007064 A1 * | 1/2009 | Yang et al. | 717/106 |
| 2012/0030646 A1 * | 2/2012 | Ravindran et al. | 717/105 |
| 2012/0254830 A1 * | 10/2012 | Conrad et al. | 717/106 |
| 2014/0089889 A1 * | 3/2014 | Maclay et al. | 717/104 |

OTHER PUBLICATIONS

Yotov, Kamen, et al., "A Comparison of Empirical and Model-driven Optimization", 2003, pp. 63-76.*
Petrucci, Vinicius, et al., "A dynamic optimization model for power and performance management of virtualized clusters", 2010, pp. 225-233.*
Schmidt, Douglas C., "Model-Driven Engineering", 2006, pp. 25-31.*
France, Robert, et al., "Model-driven Development of Complex Software: A Research Roadmap", 2007, pp. 1-18.*
Harrington, Anthony, et al., "Model-Driven Engineering of Planning and Optimisation Algorithms for Pervasive Computing Environments", 2011, pp. 172-180.*
Bradbury, Jeremy S., et al., "Evaluating and Improving the Automatic Analysis of Implicit Invocation Systems", 2003, pp. 78-87.*

* cited by examiner

*Primary Examiner* — Thuy Dao
*Assistant Examiner* — Christopher Franco
(74) *Attorney, Agent, or Firm* — Harrity & Harrity, LLP

(57) ABSTRACT

A device receives a model that includes blocks and lines provided between the blocks, and identifies first candidate boundaries for the model. Each of the first candidate boundaries defines a group of blocks. The device generates an intermediate representation (IR) of the model, performs an optimization of the IR to generate an optimized IR, and identifies second candidate boundaries for the model based on the optimized IR. Each of the second candidate boundaries defines a group of blocks, and the first and second candidate boundaries define a set of candidate boundaries. The device reduces the set of candidate boundaries, to a reduced set of boundaries, based on code efficiency metrics or metrics associated with a hardware platform. The device generates code for the model based on the reduced set of boundaries, and outputs the code.

21 Claims, 18 Drawing Sheets

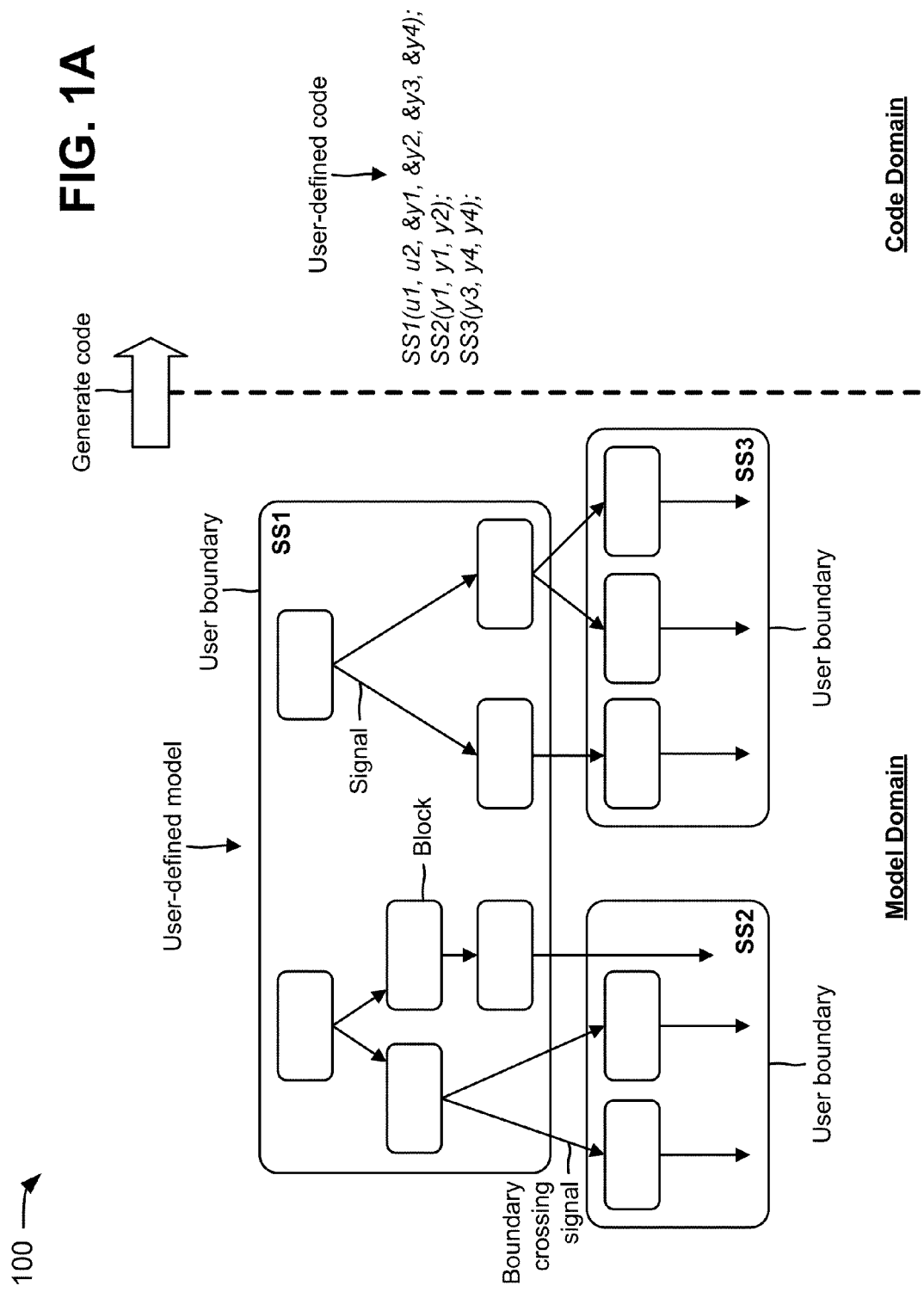

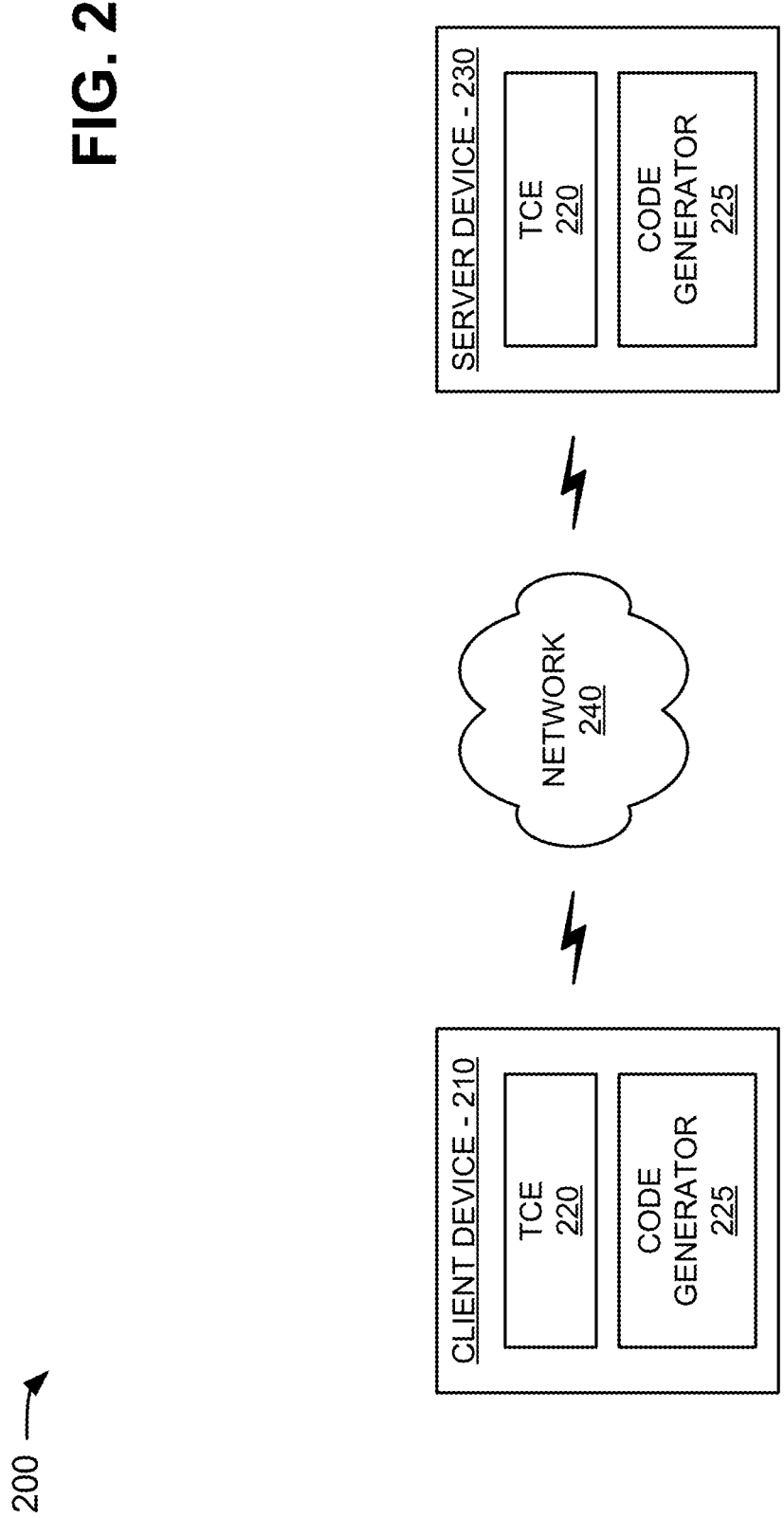

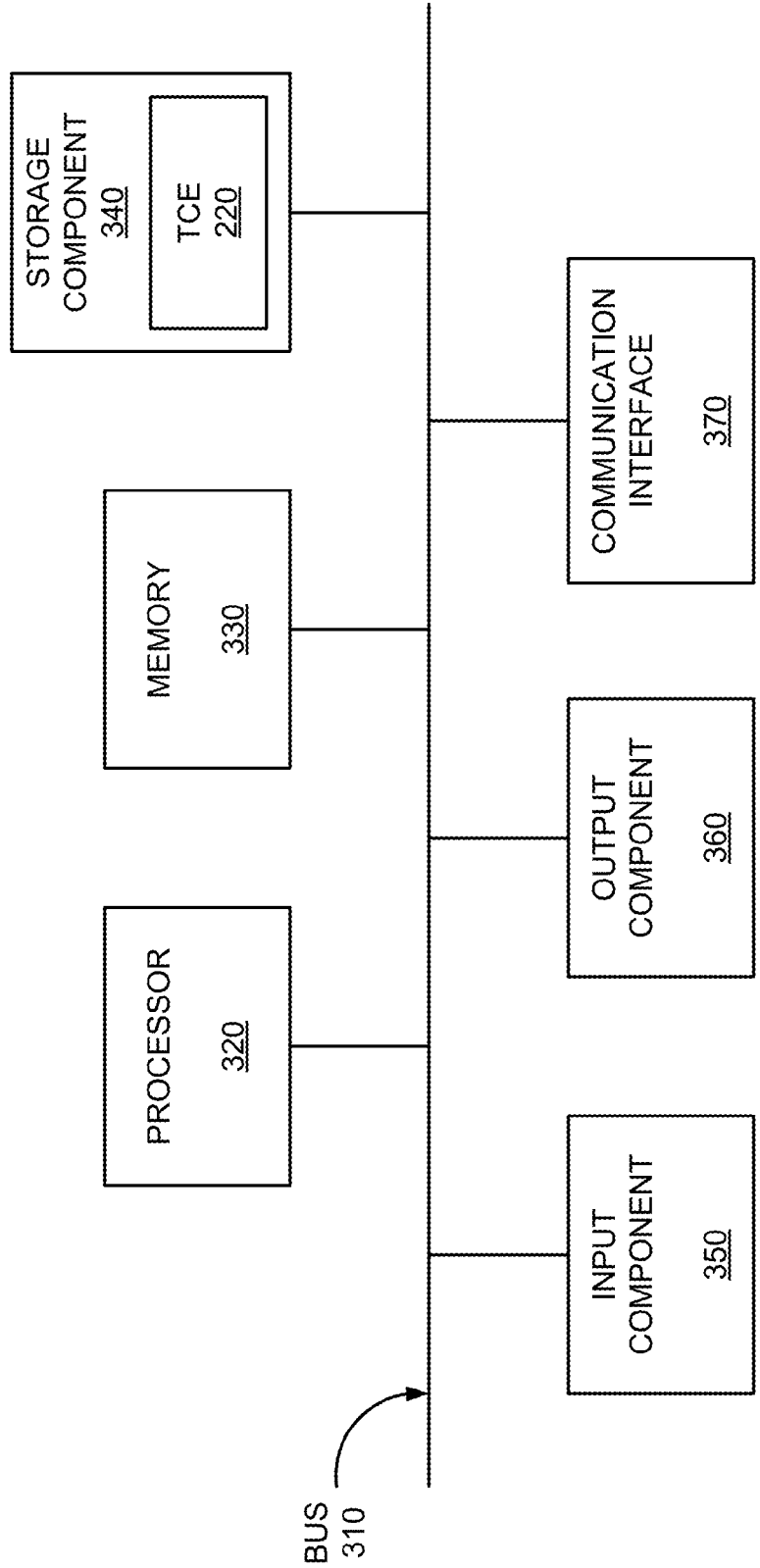

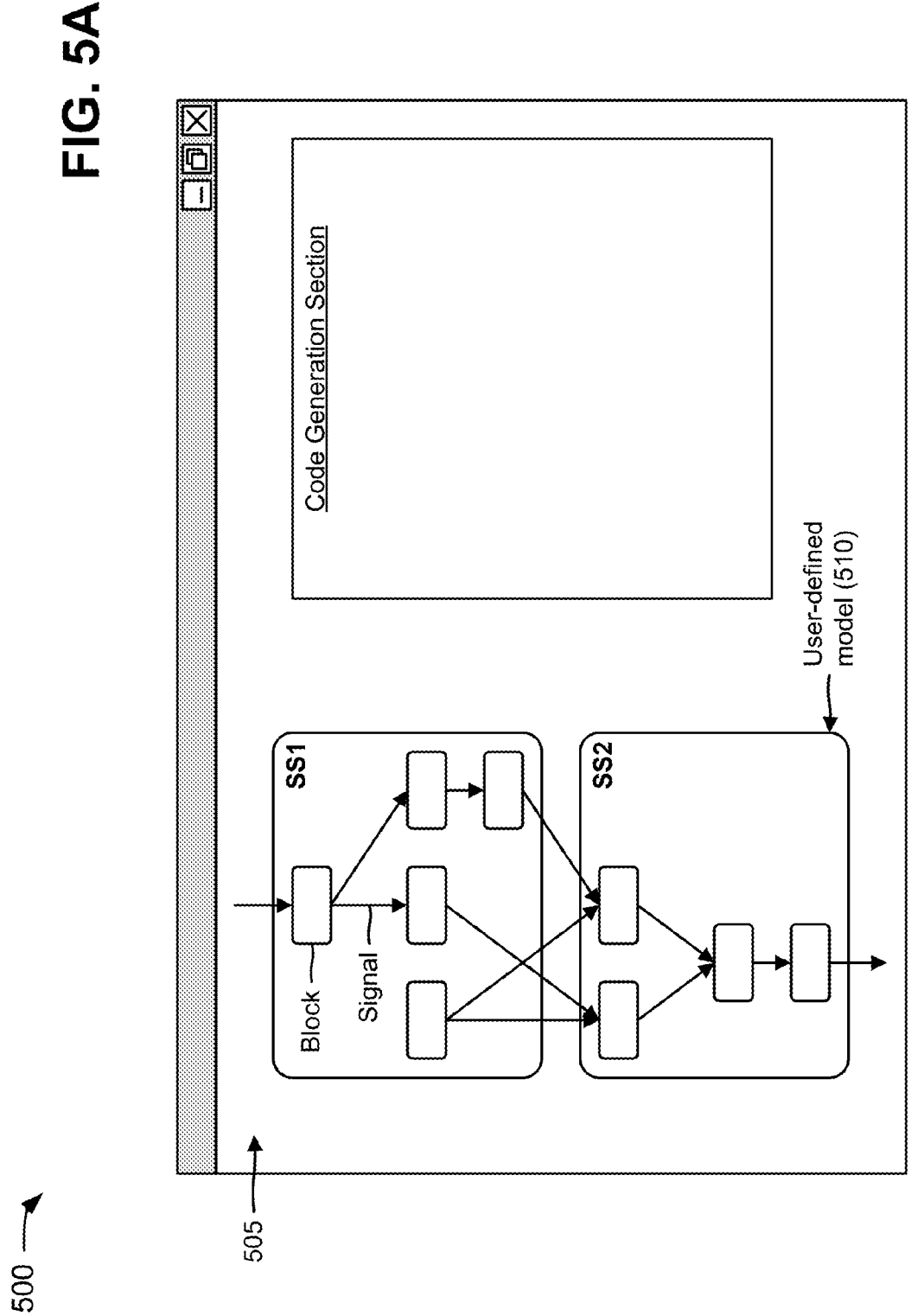

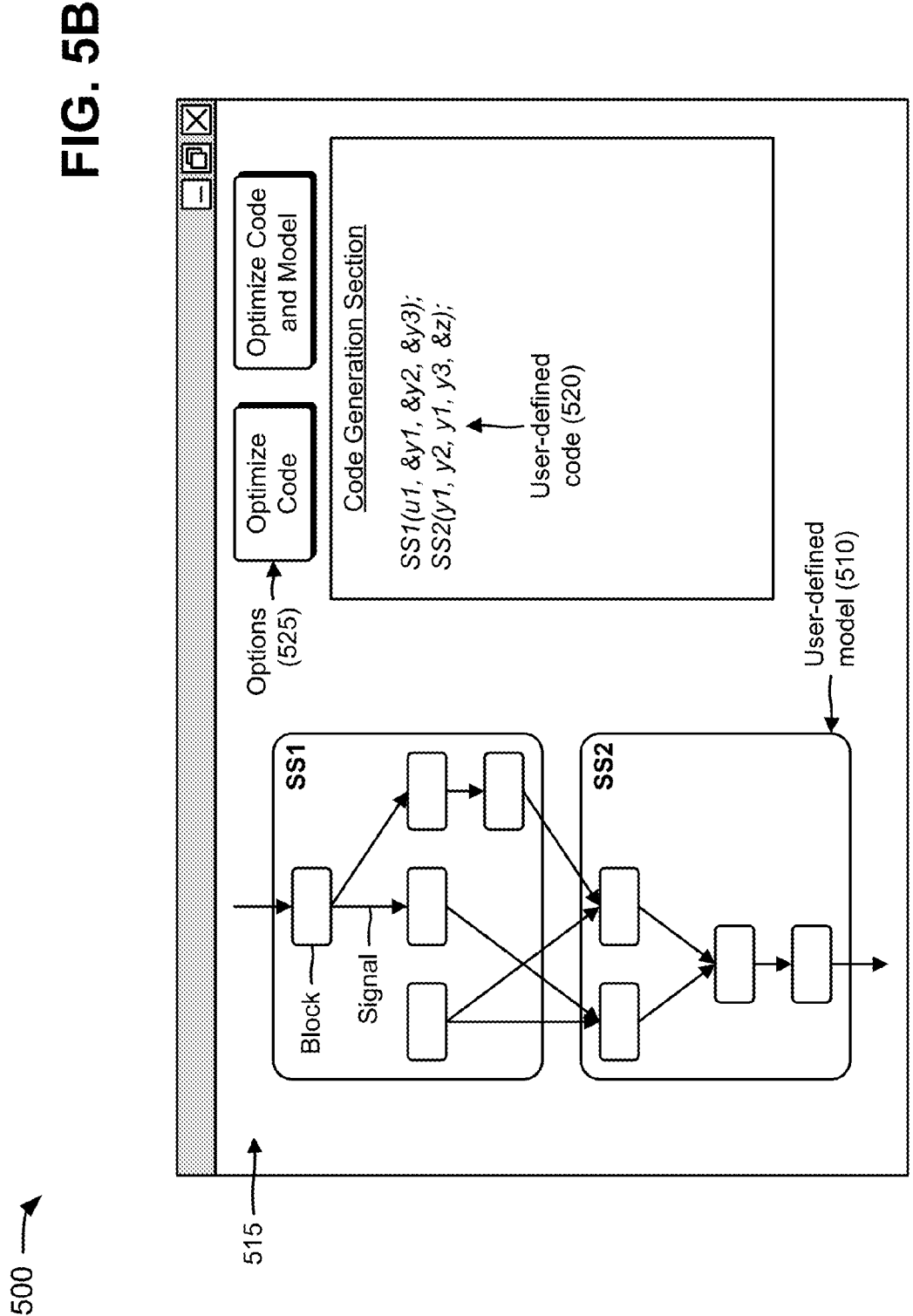

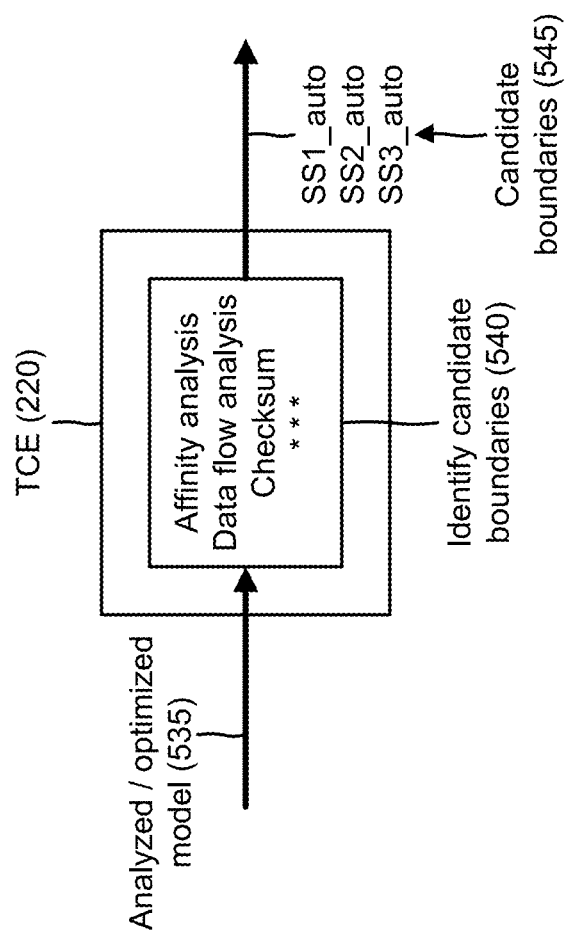

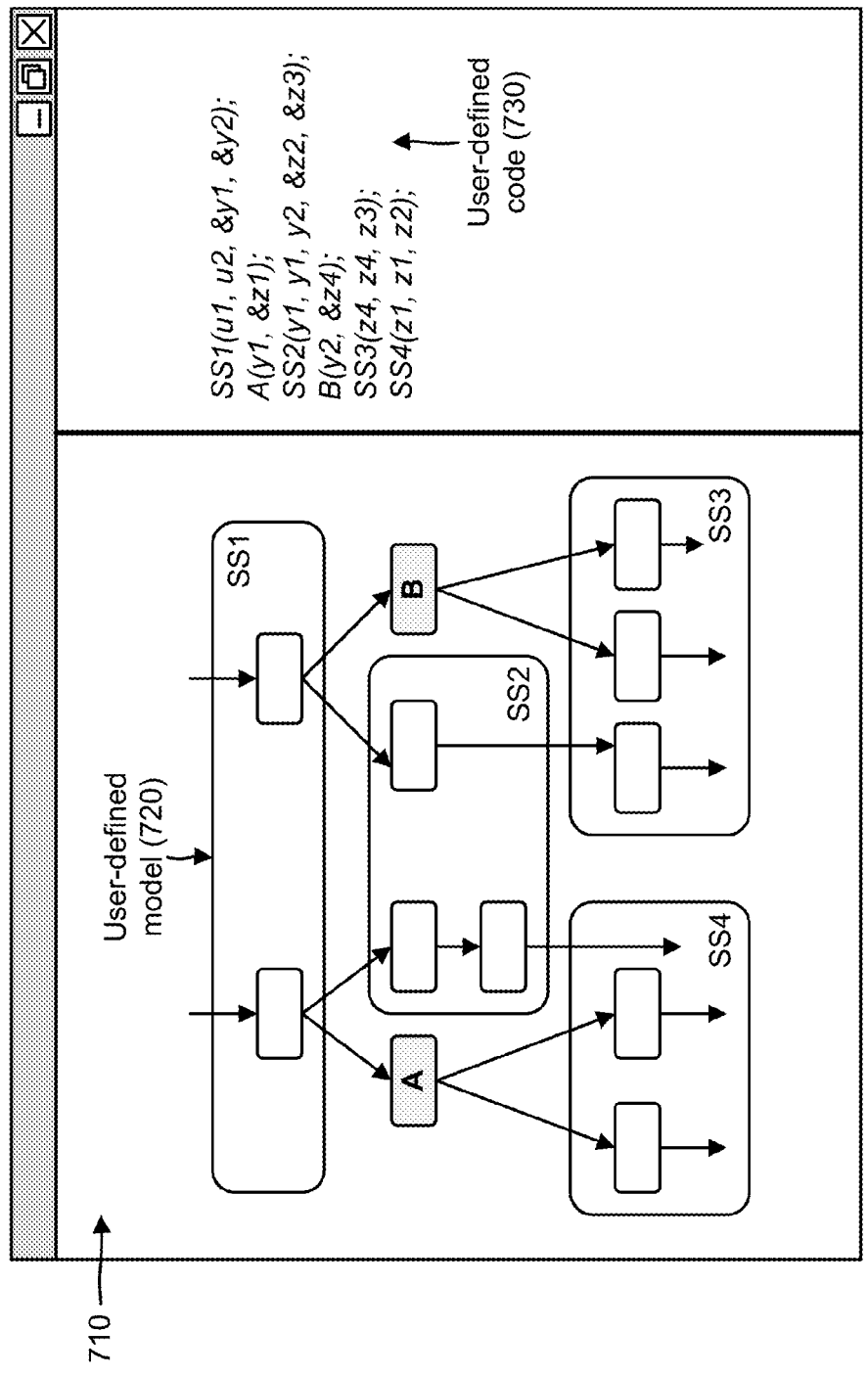

AUTOMATIC GENERATION OF AN OPTIMIZED ARRANGEMENT FOR A MODEL AND OPTIMIZED CODE BASED ON THE MODEL

BRIEF DESCRIPTION OF THE DRAWINGS

FIGS. 1A and 1B are diagrams of an overview of an example implementation described herein;

FIG. 2 is a diagram of an example environment in which systems and/or methods described herein may be implemented;

FIG. 3 is a diagram of example components of one or more devices of FIG. 2;

FIGS. 5A-5G are diagrams of an example relating to the example process shown in FIG. 4;

FIGS. 7A-7D are diagrams of still another example relating to the example process shown in FIG. 4.

DETAILED DESCRIPTION

The following detailed description of example implementations refers to the accompanying drawings. The same reference numbers in different drawings may identify the same or similar elements.

A technical computing environment (TCE) may include a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. The TCE may use an array, a vector, and/or a matrix as basic elements.

A user may utilize the TCE to generate models, such as a textual model; a graphical model with one or more model elements (e.g., blocks), one or more input signals (e.g., data), and one or more output signals (e.g., data); a combination of a textual model and a graphical model; etc. Each of the blocks may represent a physical device, a subsystem, another model, etc. of a system being modeled. In some models, signals may be generated from various blocks and may point to other blocks of the model. The user may arrange or group one or more blocks of the model into subsystem blocks. The user may utilize a code generator to define and generate code based on the user-defined model. However, the user-defined model may not be arranged in an optimized manner, and the user-defined code may not be optimized due to the arrangement of the model.

Figure 1B:
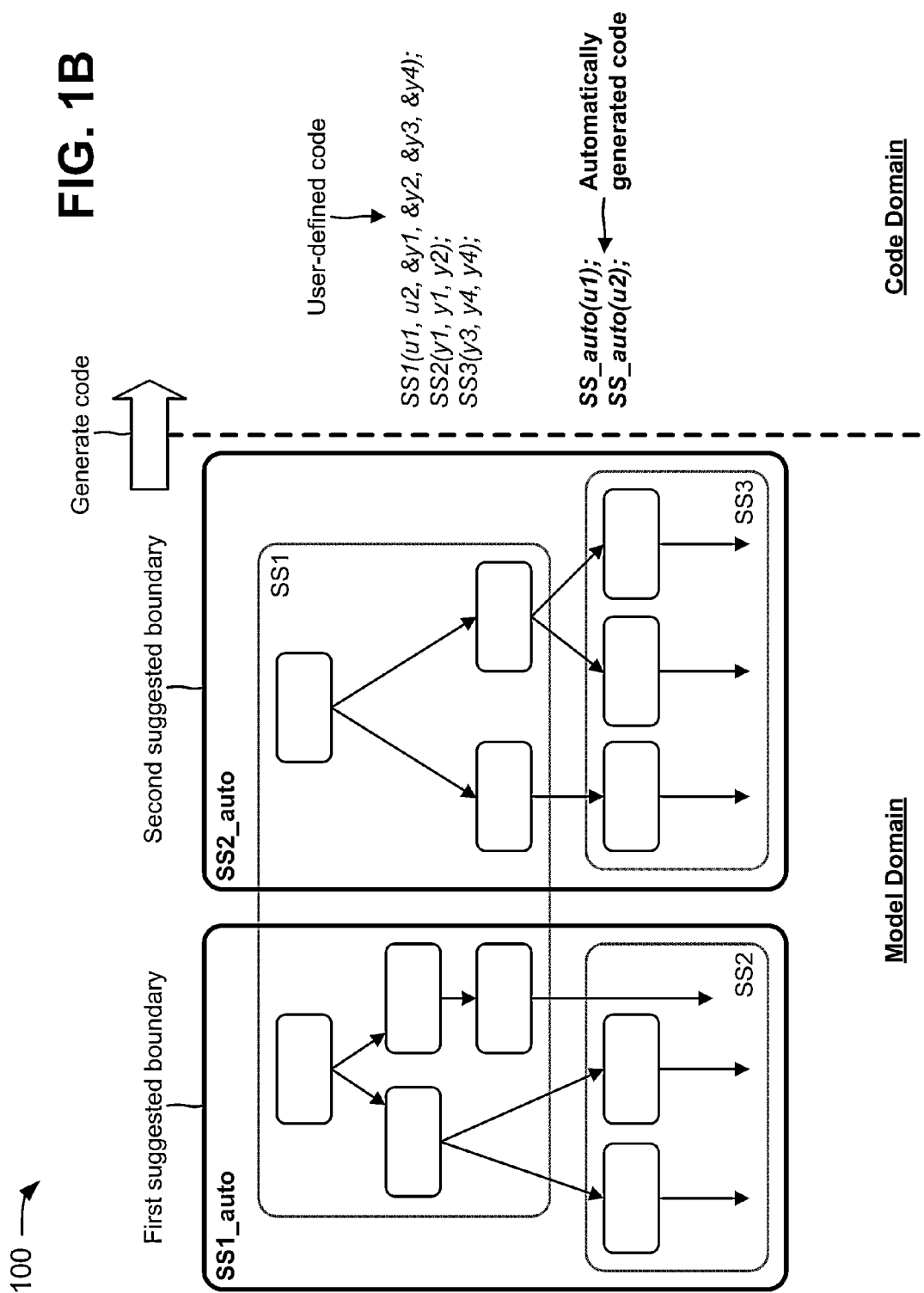

FIGS. 1A and 1B are diagrams of an overview of an example implementation 100 described herein. With reference to FIG. 1A, a user may utilize a TCE (e.g., a model domain or a portion of the TCE that enables models to be created), provided on a computing device, to generate a user-defined model. As shown in FIG. 1A, the model may include multiple blocks and signals provided between the blocks. The user may utilize the TCE to group certain blocks together into subsystem blocks. For example, the user may create a first boundary around a first group of blocks to define a first subsystem block (SS1). The user may create a second boundary around a second group of blocks to define a second subsystem block (SS2). The user may create a third boundary around a third group of blocks to define a third subsystem block (SS3). The TCE may include or be associated with a code generator (e.g., a code domain or a portion of the TCE that enables code to be generated) that receives the user-defined model, and generates code based on the user-defined model. For example, as shown in FIG. 1A, the user may utilize the code generator to generate user-defined code, such as code for the first subsystem block (e.g., SS1(u1, u2, &y1, &y2, &y3, &y4);), code for the second subsystem block (e.g., SS2(y1, y1, y2);), and code for the third subsystem block (e.g., SS3(y3, y4, y4);).

Assume that the user-defined model is not arranged in an optimized manner for execution on a hardware platform, e.g., a hardware platform of the computing device or of one or more other computing devices. Further, assume that the user-defined code is not optimized, due to the arrangement of the model, for execution on the hardware platform. The TCE may provide the user with an option to optimize the user-defined model and/or the user-defined code for the hardware platform. If the user elects to utilize the option, the TCE may analyze and optimize the model based on techniques, such as but not limited to, block reduction techniques, signal crossing techniques, etc. The TCE may identify candidate boundaries (e.g., for grouping blocks) for the model based on the analysis to optimize the model. The TCE may provide the identified candidate boundaries and the analyzed and optimized model to the code generator.

The code generator may generate an intermediate representation of the model based on the analyzed and optimized model. The code generator may analyze and optimize the intermediate representation based on techniques, such as but not limited to, a logical grouping analysis, a data dependency analysis, intermediate representation checksums, etc. The code generator may identify additional candidate boundaries for the model based on the analysis and optimization of the intermediate representation. The code generator may reduce the set of identified candidate boundaries based on code efficiency metrics and/or information associated with the hardware platform. The code generator and the TCE may provide the remaining boundaries (e.g., as suggested boundaries) from the reduced set of candidate boundaries in the model. For example, as shown in FIG. 1B, the code generator may cause the TCE to display a first suggested boundary (SS1_auto) and a second suggested boundary (SS2_auto) in the model. The code generator may also generate optimized code (e.g., SS_auto(u1); and SS_auto(u2);) based on the remaining boundaries, and may cause the computing device to display the optimized code, as further shown in FIG. 1B.

In some implementations, the first and second suggested boundaries may optimize the model since each suggested boundary does not have signals crossing over the suggested boundaries or fewer signals crossing subsystem boundaries. In some implementations, the first and second suggested boundaries may include parallel signal flows unlike the user-defined boundaries. In some implementations, the optimized code may include shorter code than the user-defined code, may not include a dependency between function calls (e.g., SS_auto(u1); and SS_auto(u2);) unlike the user-defined code, and may include function calls that share the same syntax (e.g., SS_auto) unlike the user-defined code. As a result of the suggested boundaries, the two functions may include an identical implementations, and thus may include two calls (e.g., SS_auto(u1); and SS_auto(u2);) that call the same function (e.g., SS_auto).

Systems and/or methods described herein may provide improved efficiency and reuse of generated code over user-defined code. For example, the systems and/or methods may reduce memory consumption by the generated code and runtime memory consumption, may reduce a size (e.g., a number of lines) of the generated code, may increase execution speed of the generated code, may enable parallelization and/or distribution of the generated code, etc. The systems and/or methods may generate code that is similar to hand-coded syntax generated by a user, and may provide insights to the user with respect to boundaries (e.g., groupings of blocks) for the model.

FIG. 2 is a diagram of an example environment 200 in which systems and/or methods described herein may be implemented. As shown in FIG. 2, environment 200 may include a client device 210, which may include a technical computing environment (TCE) 220 and a code generator 225. In some implementations, code generator 225 may be part of TCE 220. Furthermore, environment 200 may include a server device 230, which may include TCE 220 and code generator 225, and a network 240. Devices of environment 200 may interconnect via wired connections, wireless connections, or a combination of wired and wireless connections.

Client device 210 may include one or more devices capable of receiving, generating, storing, processing, executing, and/or providing information in a manner described herein. For example, client device 210 may include a computing device, such as a desktop computer, a laptop computer, a tablet computer, a handheld computer, a server, a mobile phone (e.g., a smart phone, a radiotelephone, etc.), or a similar device. In some implementations, client device 210 may receive information from and/or transmit information to server device 230.

TCE 220 may be provided within a computer-readable medium of client device 210. Alternatively, or additionally, TCE 220 may be provided in another device (e.g., server device 230) that is accessible by client device 210. TCE 220 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 220 may include a dynamically-typed programming language (e.g., the M language, a MATLAB® language, a MATLAB-compatible language, a MATLAB-like language, etc.) that can be used to express problems and/or solutions in mathematical notations.

For example, TCE 220 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 220 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc. In some implementations, TCE 220 may provide high level programming with a dynamically-typed language or an array-based language that may be a form of modeling.

TCE 220 may further provide mathematical functions and/or graphical tools (e.g., for creating plots, surfaces, images, volumetric representations, etc.). In some implementations, TCE 220 may provide these functions and/or tools using toolboxes (e.g., toolboxes for signal processing, image processing, data plotting, parallel processing, etc.). In some implementations, TCE 220 may provide these functions as block sets or in another way, such as via a library, etc.

TCE 220 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dassault Systemes; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dassault Systemes; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 220 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time. In some implementations, the arrays may include a cell array. A cell array may include a data type with indexed data containers called cells. Each cell may contain any type of data. A cell array may commonly contain lists of text strings, combinations of text and numbers from spreadsheets or text files, or numeric arrays of different sizes.

For example, suppose a program, written in a dynamically typed array-based computing language, includes the following statements:

A='hello'
A=int32([2, 3])
A=[1.1, 2.2, 3.3].

Now suppose the program is executed, for example, in TCE 220. During run-time, when the statement "A='hello'" is executed the data type of variable "A" may be a string data type. Later when the statement "A=int32([2, 3])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

In some implementations, TCE 220 may provide mathematical routines and a high-level programming language suitable for non-professional programmers and may provide graphical tools that may be used for creating plots, surfaces, images, volumetric representations, or other representations. TCE 220 may provide these routines and/or tools using toolboxes (e.g., toolboxes for signal processing, image processing, data plotting, parallel processing, etc.). TCE 220 may also provide these routines in other ways, such as, for example, via a library, local or remote database (e.g., a database operating in a computing cloud), remote procedure calls (RPCs), and/or an application programming interface (API). TCE 220 may be configured to improve runtime performance when performing computing operations. For example, TCE 220 may include a just-in-time (JIT) compiler, and may be used with a complex instruction set computer (CISC), reduced instruction set computing (RISC), a microprocessor without interlocked pipeline stages (MIPS), quantum computing, etc.

A dynamic system (either natural or man-made) may be a system whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), bio-chemical systems (gene expression, protein pathways), weather, and climate pattern systems, and/or any other natural dynamic system. Man-made or engineered dynamic systems may include, for example, a bouncing ball, a spring with a mass tied on an end, automobiles, aircrafts, control systems in major appliances, communication networks, audio signal processing systems, and a financial or stock market, and/or any other man-made or engineered dynamic system.

The system represented by a model may have various execution semantics that may be represented in the model as a collection of modeling entities, often referred to as blocks. A block may generally refer to a portion of functionality that may be used in the model. The block may be represented graphically, textually, and/or stored in some form of internal representation. Also, a particular visual depiction used to represent the block, for example in a graphical block diagram, may be a design choice.

A block may be hierarchical in that the block itself may include one or more blocks that make up the block. A block including one or more blocks (sub-blocks) may be referred to as a subsystem block. A subsystem block may be configured to represent a subsystem of the overall system represented by the model. A subsystem block may be a masked subsystem block that is configured to have a logical workspace that contains variables only readable and writeable by elements contained by the subsystem block.

A graphical model (e.g., a functional model) may include entities with relationships between the entities, and the relationships and/or the entities may have attributes associated with them. The entities may include model elements, such as blocks and/or ports. The relationships may include model elements, such as lines or signals (e.g., connector lines) and references (e.g., textual labels). The attributes may include model elements, such as value information and meta information for the model element associated with the attributes. A graphical model may be associated with configuration information. The configuration information may include information for the graphical model, such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

In some implementations, a graphical model may have executable semantics and/or may be executable. An executable graphical model may be a time-based block diagram model. A time-based block diagram model may include, for example, blocks connected by lines (e.g., connector lines). The blocks may include elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time-based block diagram, ports may be associated with blocks. A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point may be a dynamic system, for example, for the lines that represent physical connections (e.g., by summing all variables of a certain type to 0 or by equating all variables of a certain type). A port may be an input port, an output port, a non-causal port, an enable port, a trigger port, a function-call port, a publish port, a subscribe port, an exception port, an error port, a physics port, a power port an entity flow port, a data flow port, a control flow port, etc.

In some implementations, TCE 220 may provide a user with an option to optimize a user-defined model and/or user-defined code for a hardware platform. If the user elects to utilize the option, TCE 220 may analyze and optimize the model based on block reduction techniques, signal crossing techniques, etc. TCE 220 may identify candidate boundaries (e.g., for grouping blocks) for the model based on the analysis and optimization of the model. TCE 220 may provide the analyzed and optimized model to code generator 225.

Code generator 225 may be provided in client device 210 or may be provided in another device (e.g., server device 230) that is accessible by client device 210. In some implementations, code generator 225 may generate an intermediate representation (IR) based on the analyzed and/or optimized model generated by TCE 220. An intermediate representation or IR may include a translation of a model, a representation of a model (e.g., a data structure that may be stored in memory, a file, a database, and/or other storage media), etc. An IR may be constructed from input data contained within a source language (e.g., a language used by a model) and from which part or all of output data contained in a target language (e.g., generated code) may be constructed. An IR may include a control flow graph (CFG), a data flow graph (DFG), a hybrid graph (e.g., a graph that includes a CFG and a DFG), and/or another representation that preserves properties of information in the source language. An IR may allow for serial and/or parallel processing of the representation in the source language within the IR. The use of an IR may permit translation of a representation in a source language into a representation in a target language such that a system implementation may be generated from an initial system model.

In some implementations, an IR may be generated from a model, created via TCE 220, before generating code represented by a programming language (e.g., C, C++, Fortran, Java, etc.), a hardware description language (e.g., Verilog, etc.), a scripting language (e.g., Perl, Python, Javascript, etc.), and/or a machine or assembly language. In some implementations, code generator 225 may parse a model into syntactical components, and may use the syntactical components to construct an IR such that the IR may represent the semantics of the model. In some implementations, code generator 225 may allow a user to develop an IR for user-specified elements. The IR may be based on computations to be performed, and may not follow model elements (e.g., as they are presented in a model). The IR may permit optimizations to be applied across multiple elements of a model.

In some implementations, code generator 225 may analyze and optimize the IR based on a logical grouping analysis, a data dependency analysis, IR checksums, etc. Code generator 225 may identify additional candidate boundaries for the model based on the analysis and optimization of the IR. Code generator 225 may reduce the set of candidate boundaries based on code efficiency metrics and/or information associated with the hardware platform. Code generator 225 may provide the remaining boundaries, from the reduced set of candidate boundaries, in the model (e.g., as suggested or recommended boundaries). In some implementations, code generator 225 may generate optimized code based on the remaining boundaries.

In some implementations, a hardware platform may include a homogeneous hardware platform of the same type of processing components (e.g., a central processing unit (CPU), a graphical processing unit (GPU), an application-specific integrated circuit (ASIC), a field-programmable gate array (FPGA), etc.). A homogeneous hardware platform may include a combination of the same type of computing components (e.g., the same type of processing components). In some implementations, the hardware platform may include a heterogeneous hardware platform of different types of processing components. A heterogeneous hardware platform may include a combination of different types of computing components (e.g., different types of computing cores, computing cores combined with signal processing intrinsics, computing cores combined with FPGAs, etc.).

Server device 230 may include one or more devices capable of receiving, generating, storing, processing, executing, and/or providing information in a manner described herein. For example, server device 230 may include a computing device, such as a server, a desktop computer, a laptop computer, a tablet computer, a handheld computer, or a similar device. In some implementations, server device 230 may host TCE 220 and/or code generator 225.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an opportunistic network, an intranet, the Internet, a fiber optic-based network, and/or a combination of these or other types of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300, which may correspond to client device 210 and/or server device 230. In some implementations, each of client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, a digital signal processor (DSP), and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320. In some implementations, processor 320 may include, for example, an ASIC.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330 and/or storage component 340. A computer-readable medium is defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
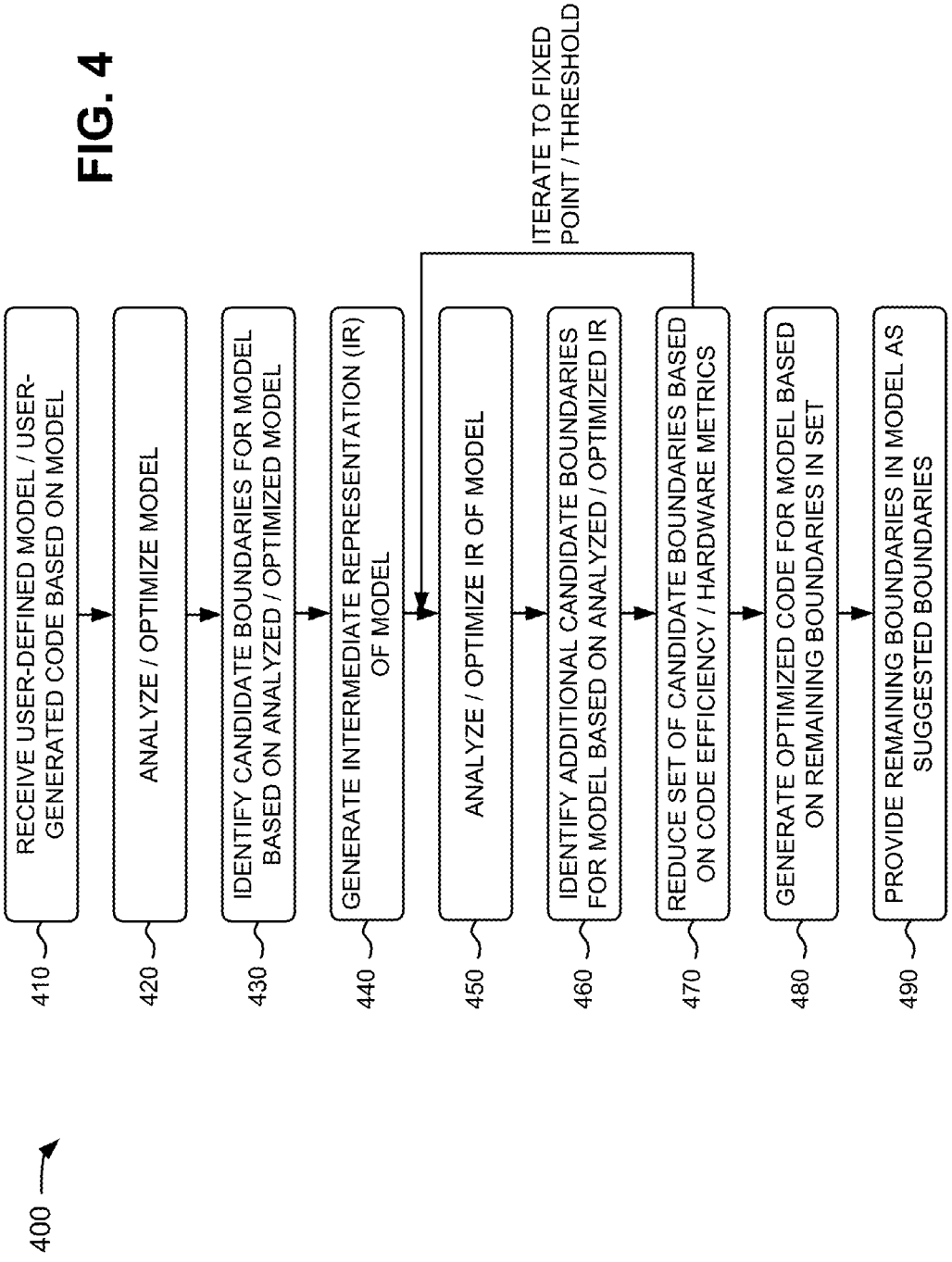
FIG. 4 is a flow chart of an example process for automatically generating an optimized arrangement for a model and optimized code based on the model.

FIG. 4 is a flow chart of an example process 400 for automatically generating an optimized arrangement for a model and optimized code based on the model. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include receiving a user-defined model and user-generated code based on the model (block 410). For example, a user may utilize client device 210 and TCE 220 to define and create a model and/or to display the model. In some implementations, the user may utilize client device 210 to receive the model from another device (e.g., server device 230) or to retrieve the model from memory associated with client device 210. In some implementations, the model may include a graphical model with one or more blocks, one or more input signals (e.g., data), and one or more output signals (e.g., data). In some implementations, each of the blocks may represent a portion of a system being modeled. In some implementations, signals may be generated from various blocks and may point to other blocks of the model. In some implementations, the user may utilize TCE 220 to group certain blocks together into subsystem blocks. Each subsystem block may be defined by a user-defined boundary that is provided around the blocks grouped together in the subsystem block.

In some implementations, code generator 225 may receive the user-defined model, and may generate code based on the user-defined model. In some implementations, the user may utilize code generator 225 to generate user-defined code based on the model. For example, the user may utilize code generator 225 to generate code for the subsystem blocks defined by the user for the model. In some implementations, the user-defined code may include code generated based on a user-specified input and/or instruction.

As further shown in FIG. 4, process 400 may include analyzing and/or optimizing the model (block 420). For example, the user may instruct TCE 220 and code generator 225 to optimize the user-defined model and/or the user-generated code. In some implementations, TCE 220 may cause client device 210 to display, to the user, an option to optimize the user-generated code, an option to optimize the user-defined model, and/or an option to optimize the user-generated code and the user-defined model. Assume that the user selects the option to optimize the user-generated code and the user-defined model. Based on the selection, TCE 220 may analyze and/or optimize the model. In some implementations, the code may not be generated prior to TCE 220 analyzing and/or optimizing the code.

In some implementations, TCE 220 may perform model optimizations to optimize the quantity and arrangement of blocks in the model, to group blocks of the model together to form suggested boundaries, and to provide the suggested boundaries in the model. For example, TCE 220 may perform block reduction of the model by analyzing the model and eliminating superfluous blocks in the model. For example, if the model includes a particular block that is never executed by the model, block reduction may eliminate the particular block. In another example, if the model includes three blocks that perform the same function, block reduction may eliminate two of the three blocks.

In some implementations, TCE 220 may perform a signal crossing analysis of the model to determine whether any signals, between blocks, cross a user-defined boundary. If TCE 220 determines that one or more signals cross a user-defined boundary, TCE 220 may determine whether such signals can be grouped together so that they do not cross suggested boundaries determined by TCE 220. In some implementations, TCE 220 may identify candidate boundaries such that the signals crossing the boundaries are at a minimum. For example, if the model is a directed graph where the blocks are vertices and the connecting signals are directional edges, the problem may be converted into determining cuts, detecting strongly connected partitions, etc. of the graph. A graph theory method may be used to solve such a problem, although additional heuristics, based on domain knowledge of an application context, may produce more effective solutions.

As further shown in FIG. 4, process 400 may include identifying candidate boundaries for the model based on the analyzed and optimized model (block 430). For example, TCE 220 may utilize the analyzed and optimized model to identify one or more candidate boundaries that may be utilized as suggested boundaries for the model. In some implementations, TCE 220 may identify the candidate boundaries for the model based on a model affinity analysis. For example, the model affinity analysis may enable TCE 220 to determine relationships among functions performed by the blocks and/or the subsystem blocks of the model. If TCE 220 determines that a first block of the model performs a calculation utilized by a second block, TCE 220 may identify a relationship between the first block and the second block. If TCE 220 determines that a third block of the model does not utilize the calculation performed by the first block, TCE 220 may not identify a relationship between the first block and the third block. TCE 220 may utilize the determined relationships to identify the candidate boundaries for the model.

In some implementations, TCE 220 may identify the candidate boundaries for the model based on a data flow analysis of the model. For example, the data flow analysis may enable TCE 220 to determine information about a possible set of values calculated at various points in the model. In such an example, TCE 220 may utilize a control flow graph (CFG) of the model to determine portions of the model to which a particular value might propagate. TCE 220 may utilize the determined portions of the model to identify the candidate boundaries for the model. For example, if the particular value propagates to three particular blocks of the model, TCE 220 may identify a candidate boundary that includes the three particular blocks.

In some implementations, TCE 220 may identify the candidate boundaries for the model based on a checksum analysis of the model. A checksum may include data (e.g., input data, output data, etc.), associated with a block of the model, that may be calculated for the purpose of detecting errors that may have been introduced during transmission or storage of the data. The checksum analysis may enable TCE 220 to determine whether one or more blocks of the model include the same checksum. For example, assume that a first block and a second block of the model include the same checksum. Based on this, TCE 220 may determine that the first block and the second block have the same input data, and may be grouped together. Therefore, TCE 220 may identify a candidate boundary that includes the first block and the second block.

In some implementations, TCE 220 may provide the analyzed and optimized model and information associated with the identified candidate boundaries to code generator 225.

As further shown in FIG. 4, process 400 may include generating an intermediate representation (IR) of the model (block 440). For example, code generator 225 may generate an IR of the analyzed and optimized model received from TCE 220. In some implementations, code generator 225 may parse the model into syntactical components (e.g., blocks, signals, etc.), and may use the syntactical components to construct the IR such that the IR may represent semantics of the model. In some implementations, the IR may include an abstract form of the model that facilitates analysis of the model and/or transformation of the model into code.

As further shown in FIG. 4, process 400 may include analyzing and optimizing the intermediate representation of the model (block 450). For example, code generator 225 may analyze and/or optimize the IR of the model. In some implementations, code generator 225 may perform an inline optimization of the IR. The inline optimization may enable code generator 225 to improve speed and memory usage during execution of code generated based on the model (referred to herein as "generated code"). In some implementations, code generator 225 may utilize the inline optimization to eliminate superfluous signals between blocks of the model. For example, assume that the model utilizes a signal (e.g., a call instruction) to invoke a function in a block. In such an example, the inline optimization may enable the function to be invoked without the call instruction (e.g., by eliminating the signal from the model), which may improve memory usage and/or execution speed.

In some implementations, code generator 225 may perform a code motion optimization of the IR to reduce a frequency with which a computation is performed by the model. For example, the code motion optimization may enable code generator 225 to group one or more of the blocks of the model together so that the blocks may be executed in parallel. In another example, the code motion optimization may enable code generator 225 to move statements or expressions of the generated code outside of a loop without affecting the semantics of the generated code. This may enable the statements or expressions to be executed less frequently, which may increase the execution speed of the generated code.

As further shown in FIG. 4, process 400 may include identifying additional candidate boundaries for the model based on the analyzed and optimized intermediate representation (block 460). For example, code generator 225 may identify, based on the analyzed and optimized IR, one or more additional candidate boundaries that may be utilized as suggested boundaries for the model. In some implementations, code generator 225 may identify the additional candidate boundaries for the model based on a logical grouping analysis of the IR. For example, the logical grouping analysis may enable code generator 225 to determine a logical grouping of blocks of the model that include common attributes. If code generator 225 determines that a first block and a second block of the model perform the same function, code generator 225 may identify a common attribute between the first block and the second block. If code generator 225 determines that a third block of the model does not perform the function performed by the first block, code generator 225 may not identify a common attribute between the first block and the third block. Code generator 225 may utilize the determined common attributes to identify the additional candidate boundaries for the model. For example, code generator 225 may identify an additional candidate boundary that includes the first block and the second block based on the common attribute between the first block and the second block.

In some implementations, code generator 225 may identify the additional candidate boundaries for the model based on a data dependency analysis of the IR. For example, the data dependency analysis may enable code generator 225 to determine which blocks of the model depend on other blocks of the model, and to determine whether blocks may be reordered and/or parallelized. If code generator 225 determines that a first block of the model must be executed before a second block of the model, code generator 225 may identify a data dependence between the first block and the second block. In such an example, code generator 225 may determine that the first block and the second block cannot be executed in parallel due to the data dependence, and may identify an additional candidate boundary that includes the first block and the second block. If code generator 225 determines that the first block may be executed independently of the second block, code generator 225 may identify a data independence between the first block and the second block. In such an example, code generator 225 may determine that the first block and the second block may be executed in parallel due to the data independence.

In some implementations, code generator 225 may identify the additional candidate boundaries for the model based on a checksum analysis of the IR. The checksum analysis may enable code generator 225 to determine whether one or more blocks of the model include the same checksum. For example, assume that the IR analysis indicates that a first block and a second block of the model include the same checksum. Based on this, code generator 225 may determine that the first block and the second block have the same input data, and may be grouped together. Therefore, code generator 225 may identify a candidate boundary that includes the first block and the second block.

As further shown in FIG. 4, process 400 may include reducing a set of candidate boundaries for the model based on code efficiency metrics and/or hardware metrics (block 470). For example, the identified candidate boundaries and the identified additional candidate boundaries may form a set of candidate boundaries. In some implementations, code generator 225 may reduce the set of candidate boundaries, to particular boundaries, based on code efficiency metrics and/or metrics associated with a hardware platform of client device 210. In some implementations, the code efficiency metrics may include metrics utilized to measure an efficiency of the generated code created by code generator 225. In some implementations, code generator 225 may generate code based on one or more of the candidate boundaries provided in the set of candidate boundaries. In some implementations, the code efficiency metrics may include metrics that determine a number of global variables in the generated code, stack utilization by the generated code, a number of data copies in the generated code, etc.

In some implementations, a global variable may include a variable that is accessible in every portion of the generated code. A global variable may be modified in any portion of the generated code, and any portion of the generated code may depend on the global variable. Therefore, a global variable may create mutual dependencies in the generated code, which may increase the complexity of the generated code. In some implementations, code generator 225 may attempt to create generated code that minimizes the number of global variables in the generated code. For example, code generator 225 may eliminate a particular candidate boundary from the set of candidate boundaries when the particular candidate boundary causes code generator 225 to generate code that includes a number of global variables greater than a threshold value (e.g., two, three, four, etc.).

In some implementations, stack utilization may include utilization of a stack to store a return address of functions in the generated code, registers associated with the generated code, local variables (e.g., local arrays, structures, classes, etc.) associated with generated code, etc. In some implementations, code generator 225 may attempt to create generated code that minimizes stack utilization. For example, code generator 225 may eliminate a particular candidate boundary from the set of candidate boundaries when the particular candidate boundary causes code generator 225 to generate code that utilizes a stack more than a threshold amount (e.g., in bytes, kilobytes, etc.).

In some implementations, one or more functions of the blocks of the model may cause data copies to be in the generated code provided by code generator 225, which may increase memory usage by the generated code. For example, a function of a block may produce a copy of output data for every destination to which the output data is to be passed. Such data copies may be temporarily stored in memory associated with the hardware platform. In some implementations, code generator 225 may attempt to create generated code that minimizes the number of data copies in the generated code. For example, code generator 225 may eliminate a particular candidate boundary from the set of candidate boundaries when the particular candidate boundary causes code generator 225 to generate code that includes a number of data copies greater than a threshold value (e.g., two, three, four, etc.).

In some implementations, the metrics associated with the hardware platform may include metrics utilized to measure performance characteristics of the hardware platform on which the generated code is to be implemented. For example, the hardware platform metrics may include metrics that determine an instruction set of the hardware platform, a register set of the hardware platform, a cache size of the hardware platform, RAM and/or ROM sizes of the hardware platform, parallel computing capabilities of the hardware platform, power consumption, etc.

In some implementations, the instruction set of the hardware platform may include information associated with native data types, addressing modes, a memory architecture, interrupt and exception handling, input/output components, etc. of the hardware platform. In some implementations, code generator 225 may attempt to create generated code that best utilizes the instruction set of the hardware platform. For example, code generator 225 may eliminate a particular candidate boundary from the set of candidate boundaries when the particular candidate boundary causes code generator 225 to generate code that over-utilizes or underutilizes the addressing modes, the input/output components, etc. of the hardware platform.

In some implementations, the register set of the hardware platform may include information associated with a set of registers of the hardware platform. A register may include storage available as part of a processor (e.g., processor 320, FIG. 3). In some implementations, code generator 225 may attempt to generate code that best utilizes the register set of the hardware platform. For example, code generator 225 may eliminate a particular candidate boundary from the set of candidate boundaries when the particular candidate boundary causes code generator 225 to generate code that over-utilizes or underutilizes the registers of the hardware platform.

In some implementations, the cache size of the hardware platform may include information associated with a size of cache memory of the hardware platform. In some implementations, code generator 225 may attempt to generate code that best utilizes the cache memory of the hardware platform. For example, code generator 225 may eliminate a particular candidate boundary from the set of candidate boundaries when the particular candidate boundary causes code generator 225 to generate code that over-utilizes or underutilizes the cache memory of the hardware platform.

In some implementations, code generator 225 may attempt to generate code that best utilizes the RAM and/or the ROM of the hardware platform. For example, code generator 225 may eliminate a particular candidate boundary from the set of candidate boundaries when the particular candidate boundary causes code generator 225 to generate code that over-utilizes or underutilizes the RAM and/or the ROM of the hardware platform.

In some implementations, the parallel computing capabilities of the hardware platform may include information associated with parallel computing (e.g., via multiple cores, multiple processes or threads, distributed parallel computing devices, etc.) capabilities of the hardware platform. In some implementations, code generator 225 may attempt to generate code that best utilizes the parallel computing capabilities of the hardware platform. For example, code generator 225 may determine that a particular candidate boundary from the set of candidate boundaries causes code generator 225 to generate code that cannot be executed in parallel. In such an example, code generator 225 may eliminate the particular candidate boundary from the set of candidate boundaries so that the code may be executed in parallel.

As further shown in FIG. 4, process 400 may include iterating process blocks 450-470 until a fixed point or a threshold is attained. For example, code generator 225 may repeat the analysis and/or optimization of the IR, the identification of the additional candidate boundaries, and the reduction of the set of candidate boundaries until a fixed point or a threshold is attained. In some implementations, code generator 225 may perform these operations, and may generate code based on the reduced set of the candidate boundaries. Code generator 225 may repeat the operations until further improvements (e.g., as measured by the code efficiency metrics and/or the hardware platform metrics) cannot be made to the generated code (e.g., until a fixed point is reached for the improvements).

In some implementations, code generator 225 may perform these operations, and may generate code based on the reduced set of the candidate boundaries until a time threshold or a stack threshold is reached. For example, the time threshold may include a threshold value indicating a time period (e.g., in minutes, hours, etc.) during which code generator 225 is to generate the code. In another example, the time threshold may include a threshold value indicating a time period during which TCE 220 is to execute the generated code. In another example, the stack threshold may include a threshold value indicating a size of the stack needed to execute the generated code. In such an example, as the size of the stack increases, the cost of the hardware platform may increase.

As further shown in FIG. 4, process 400 may include generating optimized code based on the remaining boundaries in the set of candidate boundaries (block 480). For example, code generator 225 may utilize the remaining boundaries in the reduced set of candidate boundaries to generate optimized code for the model. In some implementations, the optimized code may be referred to as a function interface or an efficient function interface.

In some implementations, code generator 225 may generate the optimized code based on a determined data passing scheme, such as, for example, a function argument pass-by-value scheme, a function argument pass-by-reference scheme, a data passing through a function return value scheme, a global data access function scheme, etc. In some implementations, the optimized code may include one or more methods that are provided or passed arguments (e.g., a constant or a variable) when the one or more methods are called. Pass-by-value may refer to passing a constant or a variable with a primitive data type to a method. Pass-by-reference may refer to passing an object variable to a method. Data passing through a function return value (or return value optimization) may refer to eliminating a temporary object created to hold a function's return value, which may change a behavior of the optimized code. Global access data function may refer to eliminating message passing between components (e.g., processors) of the hardware platform when executing the optimized code.

In some implementations, the optimized code may include code provided in a high-level programming language, an assembly language, an intermediate representation language (e.g., low level virtual machine (LLVM), etc.), etc. In some implementations, the optimized code may include code that is customized, without manual input from the user, for the hardware platform. The optimized code may be customized since the code is adjusted to specific hardware platform component(s) on which the code will be executed.

In some implementations, the optimized code may reduce data storage and copying between portions of the code, which may reduce code execution time and memory consumption. For example, the optimized code may reduce data storage and copying between portions of the code since the optimized code is based on the analysis of the model boundaries and one of the data passing schemes.

In some implementations, the optimized code may maintain locality of data references, which may reduce cache and register over-utilization. For example, the optimized code may maintain locality of data references since the optimized code is based on the code efficiency metrics and the hardware platform metrics.

In some implementations, the optimized code may facilitate code reuse, which may reduce code size. For example, the optimized code may facilitate code reuse since the optimized code is based on the performing checksums (e.g., which identify code reuse opportunities) on the model and the IR of the model.

In some implementations, code generator 225 may cause client device 210 to display the optimized code to the user. In some implementations, the optimized code may be displayed with or without the user-defined code previously generated by code generator 225 for the user-defined model. In some implementations, code generator 225 may cause client device 210 to store the optimized code (e.g., in memory 330, FIG. 3).

As further shown in FIG. 4, process 400 may include providing the remaining boundaries in the model as suggested boundaries (block 490). For example, code generator 225 may provide the remaining boundaries from the set of candidate boundaries to TCE 220. TCE 220 may cause client device 210 to display the remaining boundaries as suggested boundaries in the model. In some implementations, client device 210 may display the suggested boundaries with the user-defined boundaries in the model, and/or may store information associated with the suggested boundaries (e.g., in memory 330, FIG. 3). In some implementations, client device 210 may display the suggested boundaries without the user-defined boundaries in the model. In some implementations, the suggested boundaries may be different than the user-defined boundaries in the model, and may provide a more efficient grouping of the blocks of the model than the user-defined boundaries. For example, assume that the user-defined boundaries do not enable one or more blocks of the model to be executed in parallel, but that the suggested boundaries enable one or more blocks of the model to be executed in parallel. In such an example, the suggested boundaries may enable one or more blocks of the model to be executed in parallel, which may increase an execution speed of the model.

In some implementations, TCE 220 may enable the user to automatically replace one or more of the user-defined boundaries (e.g., a subset of the user-defined boundaries) in the model with one or more of the suggested boundaries (e.g., a subset of the suggested boundaries). For example, TCE 220 may cause client device 210 to display an option that, when selected, causes TCE 220 to replace the user-defined boundaries in the model with the suggested boundaries. If the user selects the option, TCE 220 may modify the model to replace the user-defined boundaries with the suggested boundaries.

In some implementations, if the user selects the option to optimize the user-generated code, TCE 220 may not cause client device 210 to display the suggested boundaries to the user. For example, the user may select the option to optimize the user-generated code if the user just wants to generate optimized code for the model and is not interested in optimizing the model. In another example, the user may select the option to optimize the user-generated code and the user-defined model if the user wants to generate the optimized code and wants to optimize the model. In some implementations, the user may select one or more optimizations for the optimized code. For example, if the user wants faster execution and does not care about memory utilization, the optimized code may be optimized accordingly. In another example, if the user wants to conserve memory utilization at the expense of slower execution, the optimized code may be optimized accordingly.

In some implementations, the efficiency of the optimized code may be improved over the user-defined code. In some implementations, the optimized code may be generated without user intervention or specification, and may provide a level of code efficiency that may not be provided by the user in the modeling domain and the code domain.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5C:
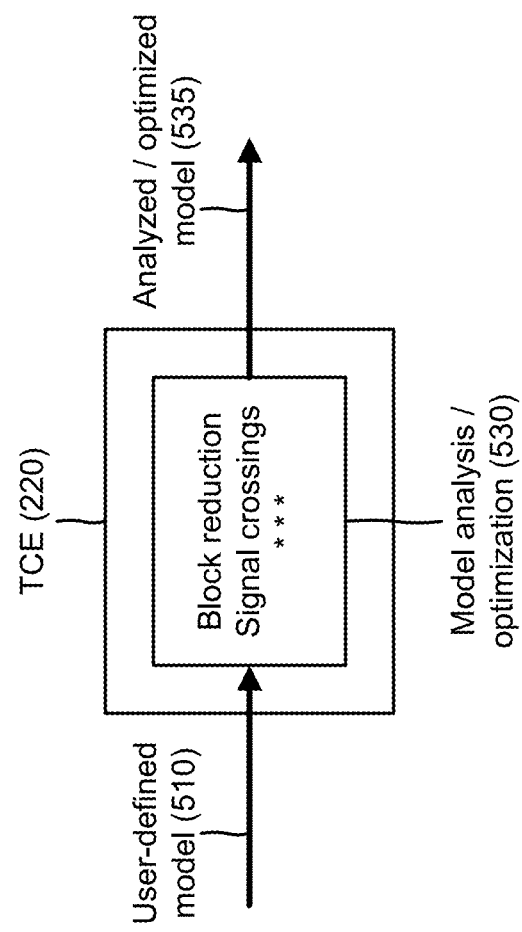

FIGS. 5A-5G are diagrams of an example 500 relating to example process 400 shown in FIG. 4. In example 500, assume that a user utilizes client device 210 to access TCE 220. Further, assume that TCE 220 causes client device 210 to display a user interface 505 associated with TCE 220, as shown in FIG. 5A. User interface 505 may enable the user to perform operations with TCE 220. For example, the user may utilize user interface 505 to define and create a model 510 for TCE 220, as further shown in FIG. 5A. User-defined model 510 may include multiple blocks and signals provided between the blocks. The user may utilize TCE 220 to group certain blocks together into subsystem blocks. For example, as shown in FIG. 5A, the user may create a first boundary around a first group of blocks to define a first subsystem block (SS1). The user may create a second boundary around a second group of blocks to define a second subsystem block (SS2).

After the user creates user-defined model 510, the user may utilize code generator 225 to generate code based on user-defined model 510. Code generator 225 may cause client device 210 to display a user interface 515, as shown in FIG. 5B. User interface 515 may enable the user to perform operations with code generator 225. For example, the user may utilize user interface 515 to define and create user-defined code 520 in a code generation section. As shown in FIG. 5B, user-defined code 520 may include code for the first subsystem block (e.g., SS1(u1, &y1, &y2, &y3);) and code for the second subsystem block (e.g., SS2(y1, y2, y1, y3, &z);). User interface 515 may include options 525, such as an option to optimize user-defined code 520 and an option to optimize user-defined code 520 and user-defined model 510. Assume that the user selects the option to optimize user-defined code 520 and user-defined model 510.

Based on selection of the option, TCE 220 may analyze and optimize user-defined model 510, as indicated by reference number 530 in FIG. 5C. For example, TCE 220 may perform block reduction techniques, signal crossing techniques, etc. on user-defined model 510 during the analysis and optimization of user-defined model 510. TCE 220 may generate an analyzed and optimized model 535 based on the analysis and optimization of user-defined model 510, as further shown in FIG. 5C.

TCE 220 may identify candidate boundaries (e.g., for grouping blocks) for user-defined model 510 based on analyzed/optimized model 535, as indicated by reference number 540 in FIG. 5D. For example, TCE 220 may perform an affinity analysis, a data flow analysis, a checksum analysis, etc. on analyzed/optimized model 535 in order to identify candidate boundaries 545 for user-defined model 510. As further shown in FIG. 5D, candidate boundaries 545 may include a first suggested boundary (SS1_auto), a second suggested boundary (SS2_auto), and a third suggested boundary (SS3_auto) for user-defined model 510.

Figure 5E:
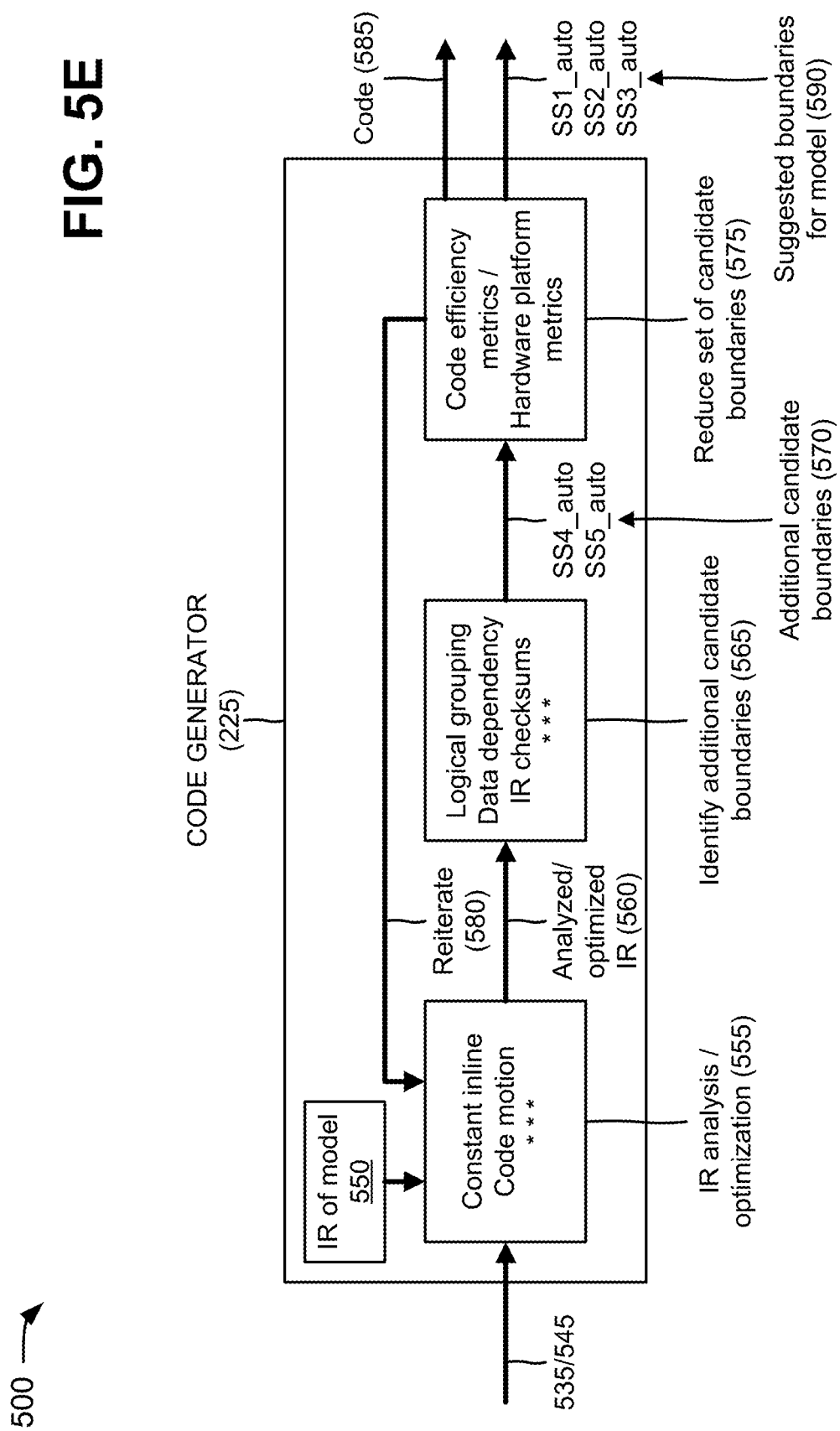

TCE 220 may provide analyzed/optimized model 535 and candidate boundaries 545 to code generator 225, as shown in FIG. 5E. Code generator 225 may generate an IR 550 of user-defined model 510 based on analyzed/optimized model 535. Code generator 225 may analyze and optimize IR 550, as indicated by reference number 555 in FIG. 5E. For example, code generator 225 may perform constant inline techniques, code motion techniques, etc. on IR 550 during the analysis and optimization of IR 550. As further shown in FIG. 5E, code generator 225 may generate an analyze/optimized IR 560 during the analysis and optimization of IR 550.

Code generator 225 may identify additional candidate boundaries for user-defined model 510 based on analyzed/optimized IR 560, as indicated by reference number 565 in FIG. 5E. For example, code generator 225 may perform a logical grouping analysis, a data dependency analysis, IR checksums analysis, etc. on analyzed/optimized IR 560 in order to identify additional candidate boundaries 570. As further shown in FIG. 5E, additional candidate boundaries 570 may include a fourth suggested boundary (SS4_auto) and a fifth suggested boundary (SS5_auto) for user-defined model 510. Code generator 225 may reduce a set of candidate boundaries (e.g., a set that includes candidate boundaries 545 and 570), as indicated by reference number 575 in FIG. 5E. For example, code generator 225 may reduce the set of candidate boundaries based on the code efficiency metrics and/or the hardware platform metrics.

As further shown in FIG. 5E, code generator 225 may reiterate 580 the analysis and/or optimization of IR 550, the identification of additional candidate boundaries 570, and the reduction of the set of candidate boundaries until a fixed point or a threshold is attained, until a particular number of times (e.g., which may be configured by the user) is attained, based on computing power, etc. Once the fixed point or threshold is attained, code generator 225 may generate optimized code 585 based on the remaining boundaries in the set of candidate boundaries. In some implementations, optimized code 585 may include an improvement with respect to some criteria (e.g., and not the absolute best with respect to the criteria) or a global optimum (e.g., meaning that no further improvement is possible respect to the criteria, based on some assumptions). For example, assume that code generator 225 reduces the set of candidate boundaries to the first suggested boundary (SS1_auto), the second suggested boundary (SS2_auto), and the third suggested boundary (SS3_auto). In such an example, code generator 225 may generate optimized code 585 based on the first, second, and third suggested boundaries for user-defined model 510.

Figure 5F:
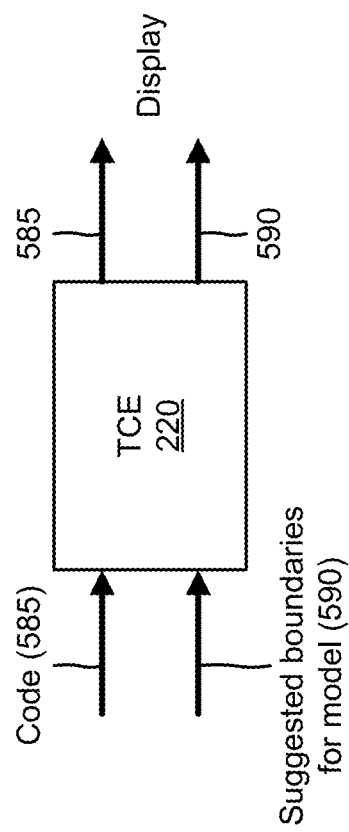

As further shown in FIG. 5E, code generator 225 may generate suggested boundaries 590 for user-defined model 510 based on the remaining boundaries in the set of candidate boundaries (e.g., SS1_auto, SS2_auto, and SS3_auto). As shown in FIG. 5F, code generator 225 may provide optimized code 585 and suggested boundaries 590 to TCE 220, and TCE 220 may cause client device 210 to display optimized code 585 and to display suggested boundaries 590 in user-defined model 510. In some implementations, client device 210 may display optimized code 585 and/or suggested boundaries 590 utilizing different block outlines, colors, shadings, labeling, etc. than user-defined model 510, and may display optimized code 585 and/or suggested boundaries 590 based on or not based on subsystem transparency.

Figure 5G:
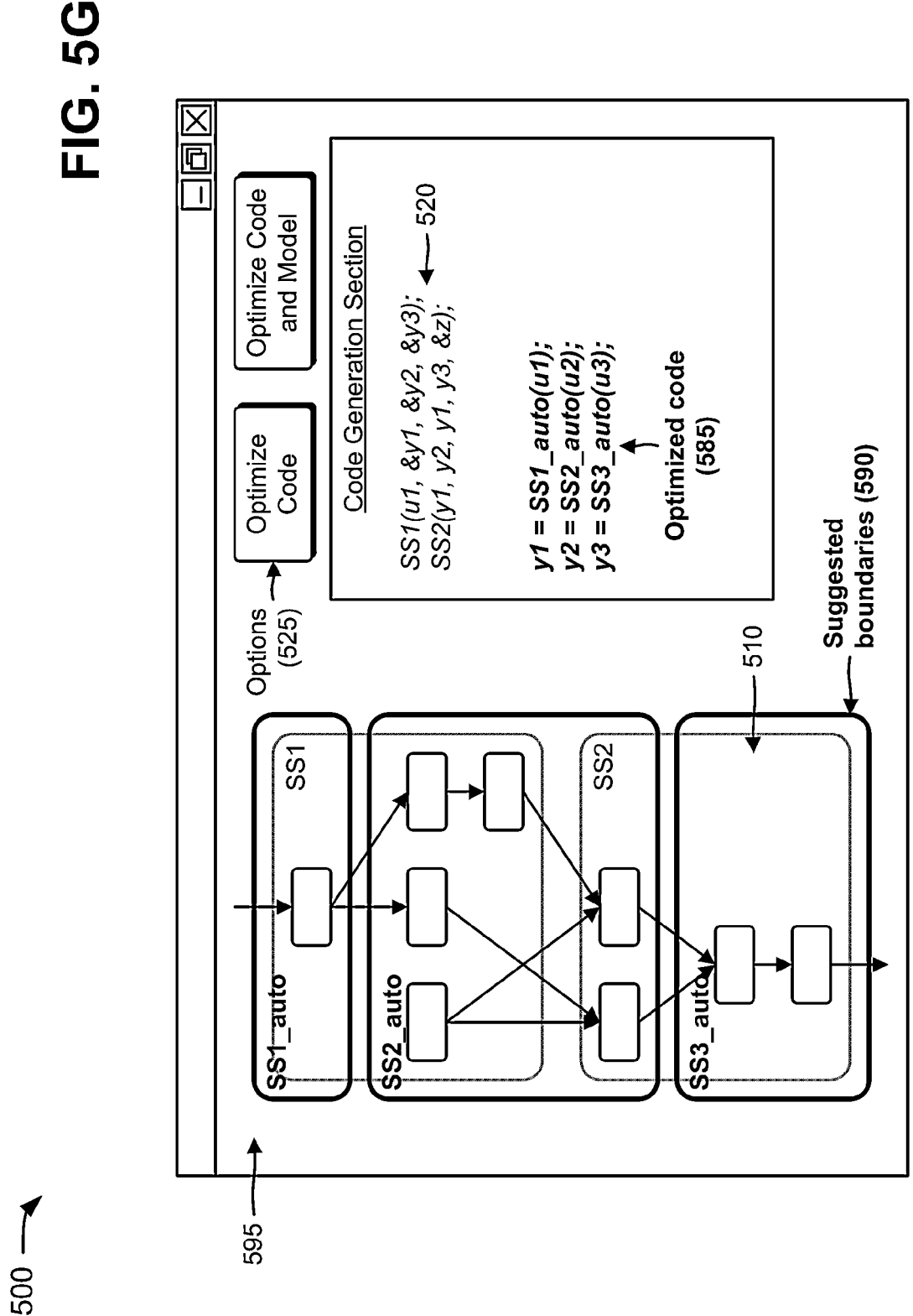

For example, as shown in FIG. 5G, client device 210 may display a user interface 595 that includes user-defined model 510 and user-defined code 520. User interface 595 may also display suggested boundaries (e.g., SS1_auto, SS2_auto, and SS3_auto) in user-defined model 510. User interface 595 may display optimized code 585 (e.g., y1=SS1_auto(u1); y2=SS2_auto(y1); and y3=SS3_auto(y2);) in the code generation section, as further shown in FIG. 5G. In some implementations, suggested boundaries 590 may optimize user-defined model 510, and optimized code 585 may resemble hand-coded syntax.

As indicated above, FIGS. 5A-5G are provided merely as an example. Other examples are possible and may differ from what was described with regard to FIGS. 5A-5G. In some implementations, the various operations described in connection with FIGS. 5A-5G may be performed automatically or at the request of the user.

Figure 6A:
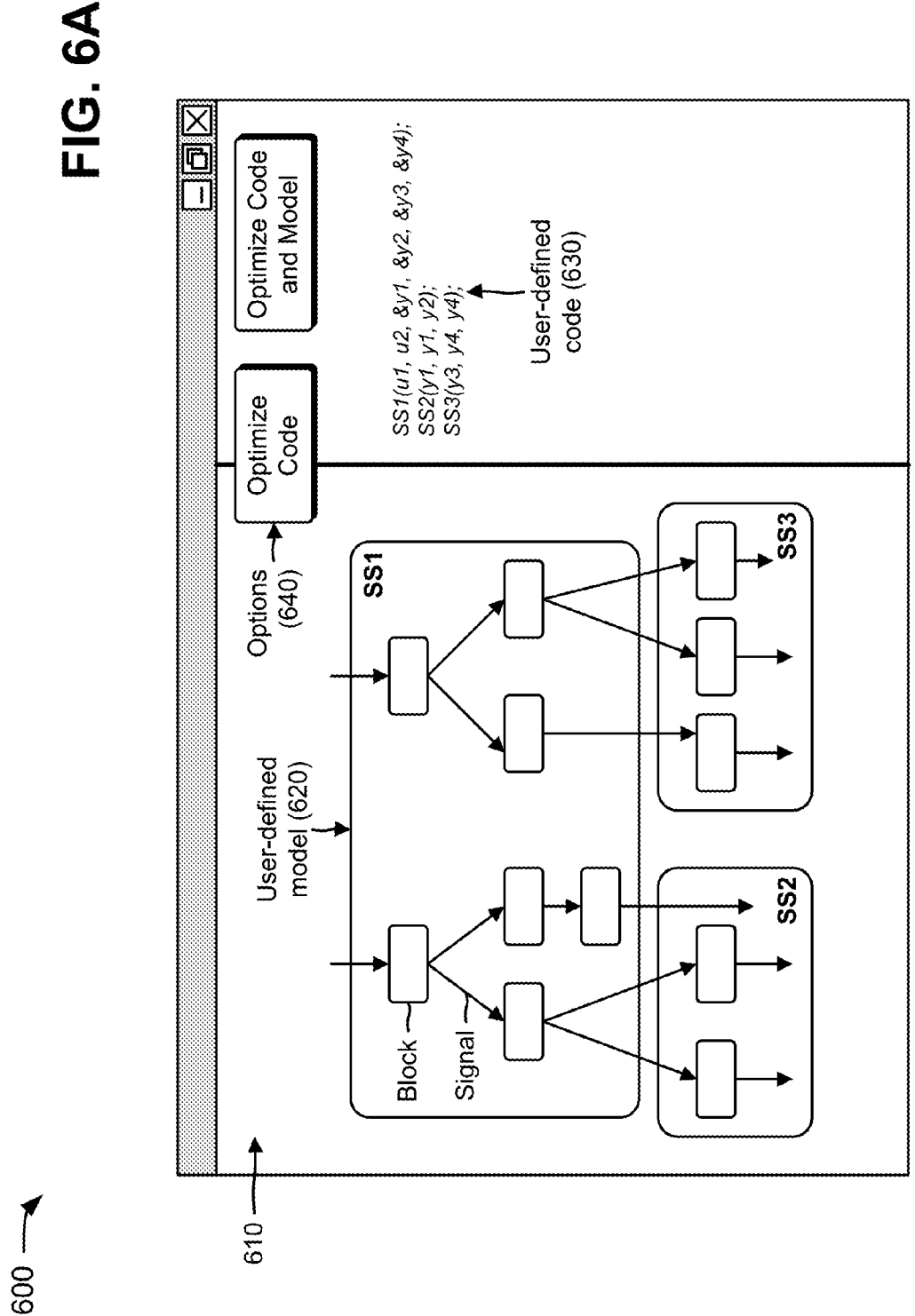
FIGS. 6A and 6B are diagrams of another example relating to the example process shown in FIG. 4.
Figure 6B:
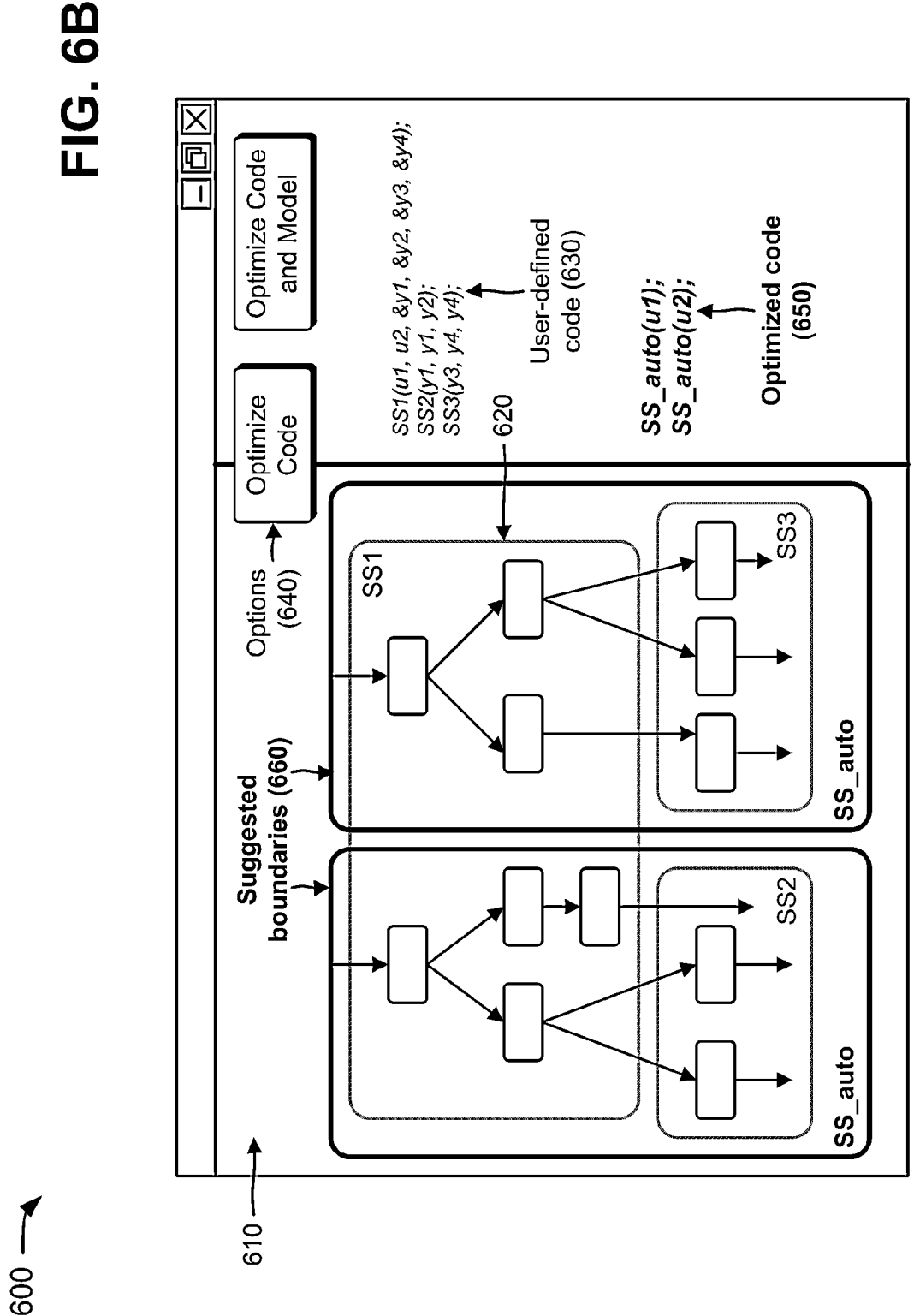

FIGS. 6A and 6B are diagrams of another example 600 relating to example process 400 shown in FIG. 4. In example 600, assume that a user utilizes client device 210 to access TCE 220. Further, assume that TCE 220 causes client device 210 to display a user interface 610 associated with TCE 220, as shown in FIG. 6A. User interface 610 may enable the user to perform operations with TCE 220. For example, the user may utilize user interface 610 to define and create a model 620 for TCE 220, as further shown in FIG. 6A. User-defined model 620 may include multiple blocks and signals provided between the blocks. The user may utilize TCE 220 to group certain blocks together into subsystem blocks. For example, as shown in FIG. 6A, the user may create a first boundary around a first group of blocks to define a first subsystem block (SS1). The user may create a second boundary around a second group of blocks to define a second subsystem block (SS2). The user may create a third boundary around a third group of blocks to define a third subsystem block (SS3). In some implementations, the user may load a previously created model into TCE 220 and/or may create the subsystem blocks differently than depicted in FIG. 6A. In some implementations, one or more of the subsystem blocks may include outputs, and each subsystem block may include a grouping construct (e.g., which may include model reference blocks and/or other mechanisms).

In some implementations, a subsystem may be either a virtual subsystem or a nonvirtual subsystem. In some implementations, a virtual subsystem may have no implication on the execution of a model, and may include a hierarchical layer for graphical purposes. For execution, the hierarchical layer of a virtual subsystem may be removed by, for example, flattening the subsystem which copies content of the subsystem into the hierarchical layer where the subsystem is located and then removes the subsystem block. In some implementations, a nonvirtual subsystem may include an execution grouping of its content. When a model executes, content of the nonvirtual subsystem may be executed in a particular manner (e.g., without interspersing the execution of other model elements). Similarly, the connections between blocks in a model may include routing model elements. Such routing elements may, for example, aggregate a number of lines into one (e.g., a vector, a bus, a multiplexed signal, etc.), select individual lines from an aggregation of lines, create connections by textual "goto" and "from" labels, etc. In some implementations, an actual input to a computation represented by a model element may refer to a value that is computed by the model element that corresponds to an execution of functionality. This input may be different from a graphical input, because, for example, of virtual subsystems and routing model elements. The actual input to a model element may be determined by tracing the hierarchy of virtual subsystems and routing model elements.

After the user creates user-defined model 620, the user may utilize code generator 225 to generate code based on user-defined model 620. User interface 610 may enable the user to perform operations with code generator 225. For example, the user may utilize user interface 610 to define and create user-defined code 630. As shown in FIG. 6A, user-defined code 630 may include code for the first subsystem block (e.g., SS1(u1, u2, &y1, &y2, &y3, &y4);), code for the second subsystem block (e.g., SS2(y1, y1, y2);), and code for the third subsystem block (e.g., SS3(y3, y4, y4);). User interface 610 may include options 640, such as an option to optimize user-defined code 630 and an option to optimize user-defined code 630 and user-defined model 620. Assume that the user selects the option to optimize user-defined code 630 and user-defined model 620.

Based on the selection of the option, TCE 220 and code generator 225 may perform the operations described above in connection with FIGS. 4-5G in order to generate optimized code 650 and suggested boundaries 660 for user-defined model 620. TCE 220 may cause client device 210 to display optimized code 650 and to display suggested boundaries 660 in user-defined model 620. For example, as shown in FIG. 6B, user interface 610 may display user-defined model 620 and suggested boundaries 660 (e.g., two SS_auto boundaries) in user-defined model 620. User interface 610 may also display optimized code 650 (e.g., SS_auto(u1); and SS_auto(u2);) with user-defined code 630, as further shown in FIG. 6B.

In some implementations, optimized code 650 may include shorter code than user-defined code 630. For example, optimized code 650 may include two function calls that share the same syntax (e.g., SS_auto), which may be beneficial for code reuse. Whereas, user-defined code 630 may include three different function calls (e.g., SS1, SS2, and SS3). In some implementations, optimized code 650 may not include dependency between function calls unlike user-defined code 630. For example, the function calls (e.g., SS_auto(u1); and SS_auto(u2);) of optimized code 650 may be independent, whereas the function calls (e.g., SS1, SS2, and SS3) of user-defined code 630 may be dependent.

In some implementations, suggested boundaries 660 may optimize user-defined model 620 since signals do not cross over suggested boundaries 660. This may enable user-defined model 620 to be more cache friendly when executed. For example, each suggested boundary 660, when executed, may cache data and may access the cached data independent of the other suggested boundary 660. Whereas, the first subsystem block (e.g., SS1), when executed, may cache data, and the second subsystem block (e.g., SS2), when executed, may cache additional data, which may push out the data cached by the first subsystem block.

As indicated above, FIGS. 6A and 6B are provided merely as an example. Other examples are possible and may differ from what was described with regard to FIGS. 6A and 6B. In some implementations, the various operations described in connection with FIGS. 6A and 6B may be performed automatically or at the request of the user.

Figure 7A:
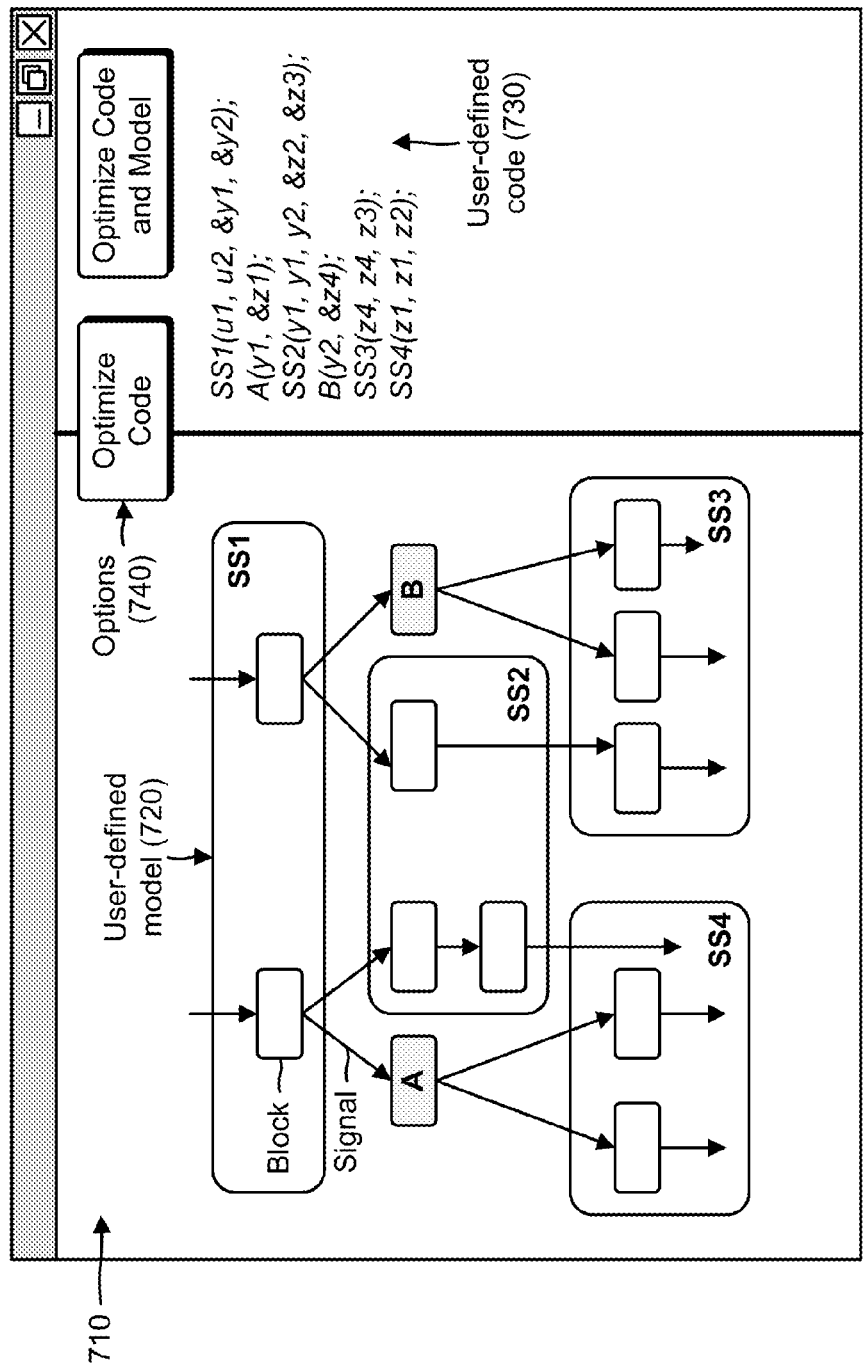

FIGS. 7A-7D are diagrams of still another example 700 relating to example process 400 shown in FIG. 4. In example 700, assume that a user utilizes client device 210 to access TCE 220. Further, assume that TCE 220 causes client device 210 to display a user interface 710 associated with TCE 220, as shown in FIG. 7A. User interface 710 may enable the user to perform operations with TCE 220. For example, the user may utilize user interface 710 to define and create a model 720 for TCE 220, as further shown in FIG. 7A. User-defined model 720 may include multiple blocks and signals provided between the blocks. The user may utilize TCE 220 to group certain blocks together into subsystem blocks. For example, as shown in FIG. 7A, the user may create a first boundary around a first group of blocks to define a first subsystem block (SS1). The user may create a second boundary around a second group of blocks to define a second subsystem block (SS2). The user may create a third boundary around a third group of blocks to define a third subsystem block (SS3). The user may create a fourth boundary around a fourth group of blocks to define a fourth subsystem block (SS4). User-defined model 720 may also include independent blocks (e.g., A and B) that are not grouped into a subsystem block.

After the user creates user-defined model 720, the user may utilize code generator 225 to generate code based on user-defined model 720. User interface 710 may enable the user to perform operations with code generator 225. For example, the user may utilize user interface 710 to define and create user-defined code 730. In some implementations, user-defined code 730 may include code written by the user (e.g., legacy code), automatically generated code for user-defined model 720, etc. The code written by the user may be reverse-engineered into boundaries analysis domains (e.g., into an IR or into modeling languages, such as Simulink). The code written by the user and/or the automatically generated code may participate in automatic function interface generation. As shown in FIG. 7A, user-defined code 730 may include code for the first subsystem block (e.g., SS1(u1, u2, &y1, &y2);); code for independent block A (e.g., A(y1, &z1);); code for the second subsystem block (e.g., SS2(y1, y1, y2, &z2, &z3);); code for independent block B (e.g., B(y2, &z4);); code for the third subsystem block (e.g., SS3(z4, z4, z3);); and code for the fourth subsystem block (e.g., SS4(z1, z1, z2);). User interface 710 may include options 740, such as an option to optimize user-defined code 730, an option to optimize user-defined code 730 and user-defined model 720, an option to optimize user-defined model 720 but not user-defined code 730, optimization criteria for user-defined model 720 (e.g., a minimum input/output), etc Assume that the user selects the option to optimize user-defined code 730 and user-defined model 720.

Figure 7B:
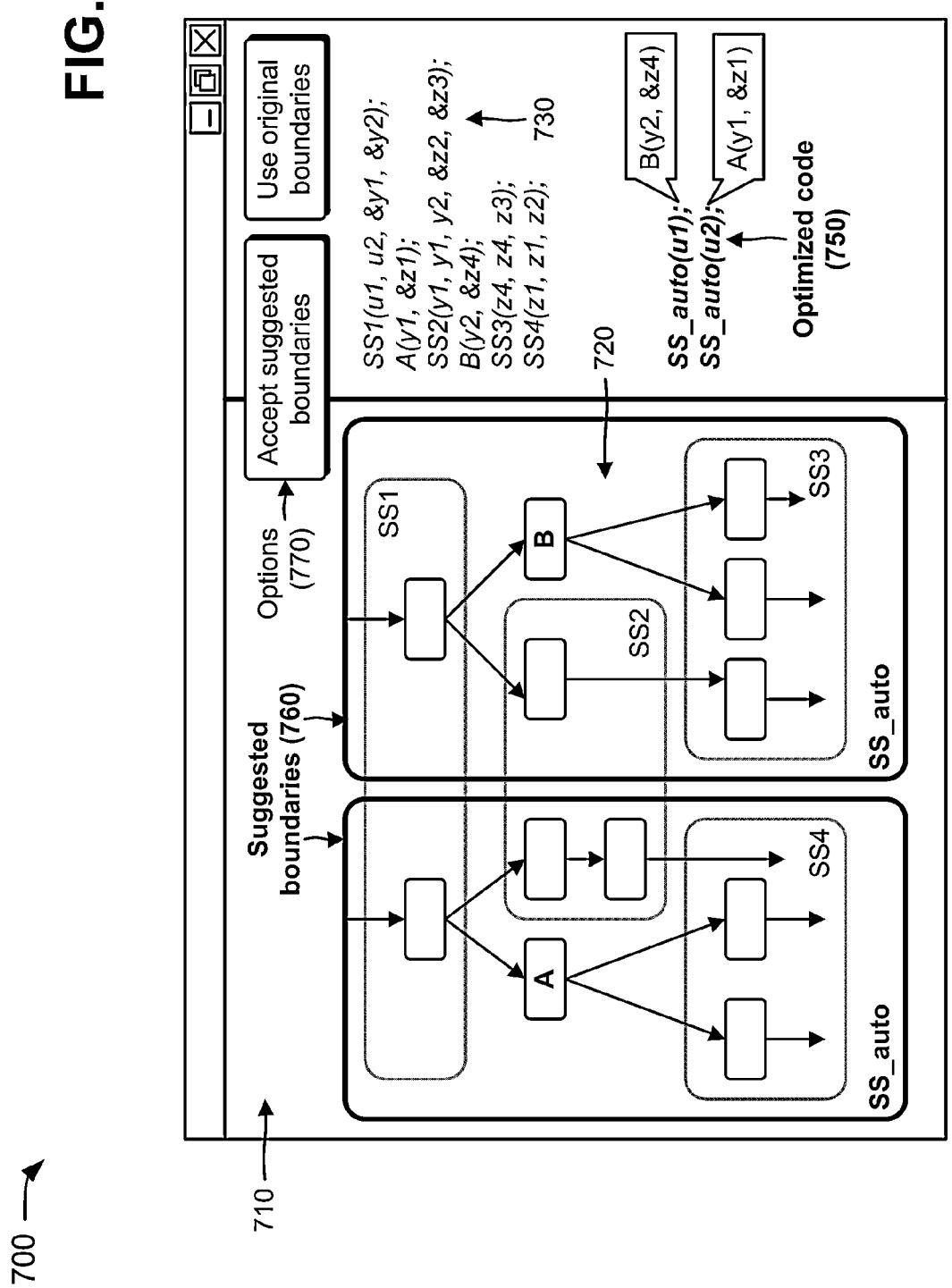

Based on the selection of the option, TCE 220 and code generator 225 may perform the operations described above in connection with FIGS. 4-5G in order to generate optimized code 750 and suggested boundaries 760 for user-defined model 720. TCE 220 may cause client device 210 to display optimized code 750 and to display suggested boundaries 760 in user-defined model 720. For example, as shown in FIG. 7B, user interface 710 may display user-defined model 720 and suggested boundaries 760 (e.g., two SS_auto boundaries) in user-defined model 720. User interface 710 may also display optimized code 750 (e.g., SS_auto(u1); and SS_auto(u2);) with user-defined code 730, as further shown in FIG. 7B.

In some implementations, optimized code 750 may include shorter code than user-defined code 730. For example, optimized code 750 includes two function calls that share the same syntax or function definition (e.g., SS_auto), which may be beneficial for code motion and may highlight the benefit of code reuse. By comparison, user-defined code 730 includes six different function calls (e.g., SS1, SS2, SS3, SS4, A, and B). In some implementations, optimized code 750 may not include dependency between function calls unlike user-defined code 730. For example, the function calls (e.g., SS_auto (u1); and SS_auto(u2);) of optimized code 750 may be independent, whereas the function calls (e.g., SS1, SS2, SS3, SS4, A, and B) of user-defined code 730 may be dependent.

In some implementations, suggested boundaries 760 may optimize user-defined model 720 since signals of user-defined model 720 do not cross over suggested boundaries 760. This may enable user-defined model 720 to be executed in parallel. For example, each suggested boundary 760 may include signal flows that are independent of the signal flows of the other suggested boundary 760, which may enable each suggested boundary 760 to be executed in parallel. Whereas, the signal flows of the subsystem blocks (e.g., SS1, SS2, SS3, SS4) and of the independent blocks (e.g., A and B) may be interdependent, which may prevent parallel execution of the subsystem blocks and the independent blocks.

Figure 7C:
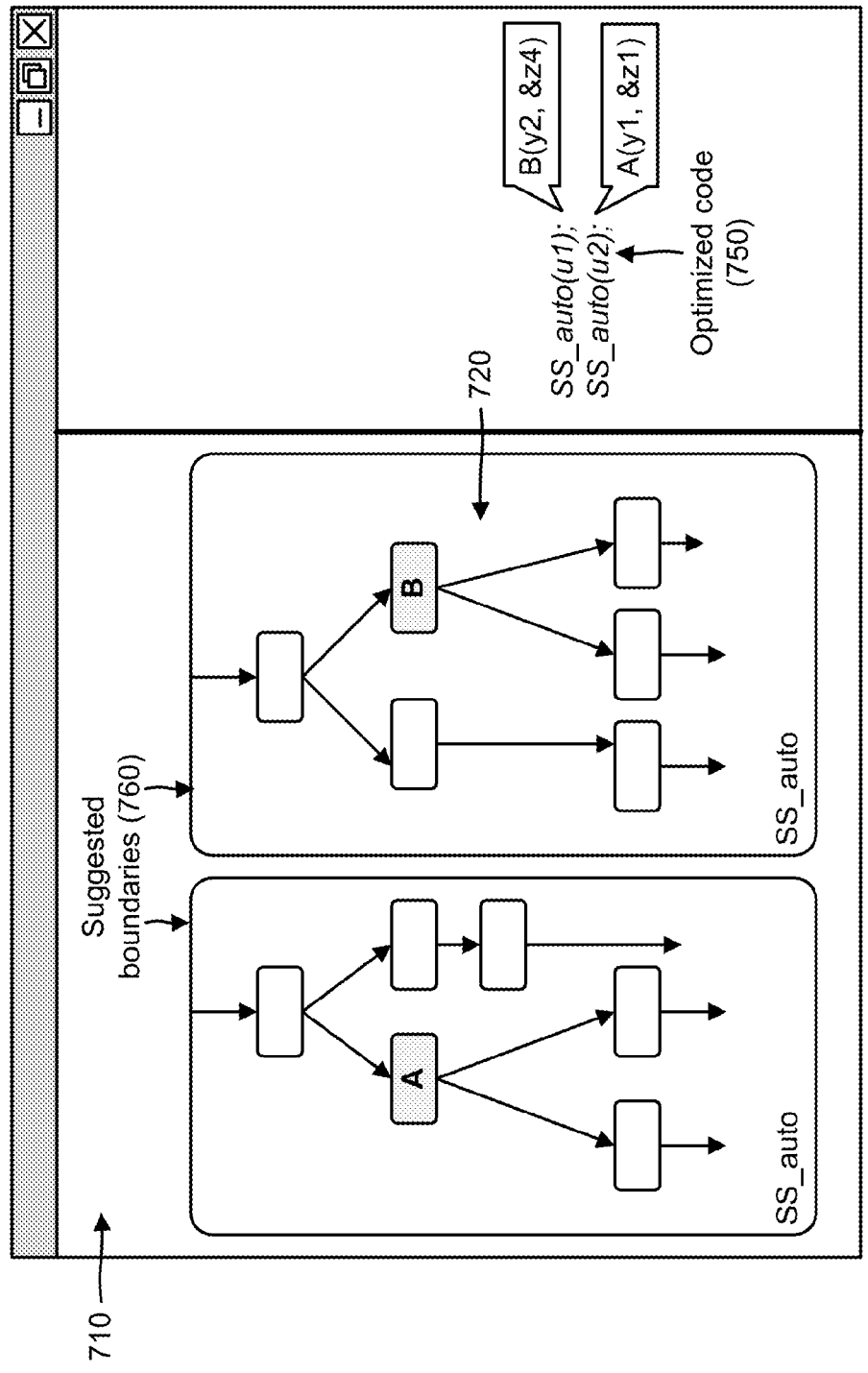

In some implementations, the user may be provided options 770, such as an option to accept suggested boundaries 760 and an option to use the original boundaries, as further shown in FIG. 7B. If the user selects the option to accept suggested boundaries, TCE 220 may remove the original boundaries (e.g., SS1, SS2, SS3, SS4), and may remove user-defined code 730, as shown in FIG. 7C. If the user selects the option to use the original boundaries, TCE 220 may remove one or more suggested boundaries 760, and may remove one or more portions of optimized code 750, as shown in FIG. 7D.

As indicated above, FIGS. 7A-7D are provided merely as an example. Other examples are possible and may differ from what was described with regard to FIGS. 7A-7D. In some implementations, the various operations described in connection with FIGS. 7A-7D may be performed automatically or at the request of the user.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of a technical computing environment (TCE) (e.g., via a touch screen display, a mouse, a keyboard, a keypad, voice commands, etc.).

Code include text-based code that may not require further processing to execute (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include code generated using a dynamically-typed programming language (e.g., the M language, a MATLAB® language, a MATLAB-compatible language, a MATLAB-like language, etc.) that can be used to express problems and/or solutions in mathematical notations. Alternatively, or additionally, code may be of any type, such as function, script, object, etc., and a portion of code may include one or more characters, lines, etc. of the code.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
    receiving a model for a technical computing environment,
        the model including a plurality of blocks and a plurality of lines, and
        the receiving the model being performed by a device;
    identifying first candidate boundaries for the model,
        each of the first candidate boundaries defining a group of one or more of the plurality of blocks of the model, and
        the identifying the first candidate boundaries being performed by the device;
    generating an intermediate representation of the model,
        the generating the intermediate representation being performed by the device;
    performing an optimization of the intermediate representation to generate an optimized intermediate representation with respect to the intermediate representation,
        the performing the optimization of the intermediate representation being performed by the device;
    identifying second candidate boundaries for the model based on the optimized intermediate representation,
        each of the second candidate boundaries defining a group of one or more of the plurality of blocks of the model,
        the first candidate boundaries and the second candidate boundaries defining a set of candidate boundaries for the model, and
        the identifying the second candidate boundaries being performed by the device;
    reducing the set of candidate boundaries, to a reduced set of boundaries, based on at least one of code efficiency metrics or metrics associated with a hardware platform,
        the reducing the set of candidate boundaries being performed by the device;
    generating code for the model based on the reduced set of boundaries,
        the generating the code being performed by the device; and
    outputting or storing the code,
        the outputting or storing the code being performed by the device.

2. The method of claim 1, further comprising:
    providing the model for display; and
    providing the reduced set of boundaries for display in the displayed model.

3. The method of claim 1, further comprising at least one of:
    performing block reduction of the model, or
    performing a signal crossing analysis of the plurality of lines of the model.

4. The method of claim 1, where identifying the first candidate boundaries comprises:
    performing at least one of:
        an affinity analysis of the model,
        a data flow analysis of the model, or
        a checksum analysis of the model; and
    identifying the first candidate boundaries for the model based on the performance of the at least one of the affinity analysis, the data flow analysis, or the checksum analysis.

5. The method of claim 1, where performing the optimization of the intermediate representation comprises at least one of:
    performing a first optimization of the intermediate representation that eliminates one or more of the plurality of lines, or
    performing a second optimization of the intermediate representation that groups one or more of the plurality of blocks together.

6. The method of claim 1, where identifying the second candidate boundaries comprises:
    performing at least one of:
        a logical grouping analysis of the intermediate representation,
        a data dependency analysis of the intermediate representation, or
        a checksum analysis of the intermediate representation; and
    identifying the second candidate boundaries for the model based on the performance of the at least one of the logical grouping analysis, the data dependency analysis, or the checksum analysis.

7. The method of claim 1, where the code efficiency metrics include one or more of:
    a metric that relates to a number of global variables in the code,
    a metric that relates to stack utilization by the code, or
    a metric that relates to a number of data copies in the code.

8. The method of claim 1, where the metrics associated with the hardware platform include one or more of:
    a metric that relates to an instruction set of the hardware platform,
    a metric that relates to a register set of the hardware platform,
    a metric that relates to a memory size of the hardware platform, or
    a metric that relates to parallel computing capabilities of the hardware platform.

9. A device, comprising:
    one or more processors to:
        receive a model for a technical computing environment,
            the model including a plurality of blocks and a plurality of lines,
            the model including user-defined boundaries, and
            each of the user-defined boundaries defining a group of one or more of the plurality of blocks of the model,
        identify first candidate boundaries for the model,
            each of the first candidate boundaries defining a group of one or more of the plurality of blocks of the model,
        generate an intermediate representation of the model, perform an optimization of the intermediate representation to generate an optimized intermediate representation with respect to the intermediate representation, identify second candidate boundaries for the model based on the optimized intermediate representation, each of the second candidate boundaries defining a group of one or more of the plurality of blocks of the model, and the first candidate boundaries and the second candidate boundaries defining a set of candidate boundaries for the model, reduce the set of candidate boundaries, to a reduced set of boundaries, based on at least one of code efficiency metrics or metrics associated with a hardware platform, the reduced set of boundaries being different than the user-defined boundaries, generate code for the model based on the reduced set of boundaries, and output or store the code.

10. The device of claim 9, where the one or more processors are further to:

provide the model for display, provide the reduced set of boundaries for display in the displayed model, and provide an option to replace the user-defined boundaries with the reduced set of boundaries.

11. The device of claim 9, where the one or more processors are further to at least one of:

perform block reduction of the model, or perform a signal crossing analysis of the plurality of lines of the model.

12. The device of claim 9, where, when identifying the first candidate boundaries, the one or more processors are further to:

perform at least one of:
an affinity analysis of the model,
a data flow analysis of the model, or
a checksum analysis of the model, and identify the first candidate boundaries for the model based on the performance of the at least one of the affinity analysis, the data flow analysis, or the checksum analysis.

13. The device of claim 9, where, when performing the optimization of the intermediate representation, the one or more processors are further to at least one of:

perform a first optimization of the intermediate representation that eliminates one or more of the plurality of lines, or perform a second optimization of the intermediate representation that groups one or more of the plurality of blocks together.

14. The device of claim 9, where, when identifying the second candidate boundaries, the one or more processors are further to:

perform at least one of:
a logical grouping analysis of the intermediate representation,
a data dependency analysis of the intermediate representation, or
a checksum analysis of the intermediate representation, and identify the second candidate boundaries for the model based on the performance of the at least one of the logical grouping analysis, the data dependency analysis, or the checksum analysis.

15. A non-transitory computer-readable medium storing instructions, the instructions comprising:

one or more instructions that, when executed by one or more processors of a device, cause the one or more processors to:

receive a model for a technical computing environment, the model including a plurality of blocks and a plurality of lines, identify first candidate boundaries for the model, each of the first candidate boundaries defining a group of one or more of the plurality of blocks of the model, generate an intermediate representation of the model, perform an optimization of the intermediate representation to generate an optimized intermediate representation with respect to the intermediate representation, identify second candidate boundaries for the model based on the optimized intermediate representation, each of the second candidate boundaries defining a group of one or more of the plurality of blocks of the model, and the first candidate boundaries and the second candidate boundaries defining a set of candidate boundaries for the model, reduce the set of candidate boundaries, to a reduced set of boundaries, based on at least one of code efficiency metrics or metrics associated with a hardware platform, generate code for the model based on the reduced set of boundaries, provide the model and the code for display, and provide the reduced set of boundaries for display in the displayed model.

16. The computer-readable medium of claim 15, where the code efficiency metrics include one or more of:

a metric that relates to a number of global variables in the code, a metric that relates to stack utilization by the code, or a metric that relates to a number of data copies in the code.

17. The computer-readable medium of claim 15, where the metrics associated with the hardware platform include one or more of:

a metric that relates to an instruction set of the hardware platform, a metric that relates to a register set of the hardware platform, a metric that relates to a memory size of the hardware platform, or a metric that relates to parallel computing capabilities of the hardware platform.

18. The computer-readable medium of claim 15, further comprising:

one or more instructions that, when executed by the one or more processors, cause the one or more processors to at least one of:

perform block reduction of the model, or perform a signal crossing analysis of the plurality of lines of the model.

19. The computer-readable medium of claim 15, where the instructions to identify the first candidate boundaries further comprise:

one or more instructions that, when executed by the one or more processors, cause the one or more processors to:

perform at least one of:
an affinity analysis of the model,
a data flow analysis of the model, or
a checksum analysis of the model, and identify the first candidate boundaries for the model based on the performance of the at least one of the affinity analysis, the data flow analysis, or the checksum analysis.

20. The computer-readable medium of claim 15, where the instructions to perform the optimization of the intermediate representation further comprise:

one or more instructions that, when executed by the one or more processors, cause the one or more processors to at least one of:

perform a first optimization of the intermediate representation that eliminates one or more of the plurality of lines, or perform a second optimization of the intermediate representation that groups one or more of the plurality of blocks together.

21. The computer-readable medium of claim 15, where the instructions to identify the second candidate boundaries further comprise:

one or more instructions that, when executed by the one or more processors, cause the one or more processors to:

perform at least one of:

a logical grouping analysis of the intermediate representation, a data dependency analysis of the intermediate representation, or a checksum analysis of the intermediate representation, and identify the second candidate boundaries for the model based on the performance of the at least one of the logical grouping analysis, the data dependency analysis, or the checksum analysis.

* * * * *